(12) United States Patent
Kasada

(10) Patent No.: US 10,522,179 B2
(45) Date of Patent: *Dec. 31, 2019

(54) MAGNETIC TAPE HAVING CHARACTERIZED MAGNETIC LAYER

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/690,906

(22) Filed: Aug. 30, 2017

(65) Prior Publication Data

US 2018/0061446 A1 Mar. 1, 2018

(30) Foreign Application Priority Data

Aug. 31, 2016 (JP) ................................ 2016-169851

(51) Int. Cl.
| | | |
|---|---|---|
| G11B 5/70 | (2006.01) | |
| G11B 5/708 | (2006.01) | |
| G11B 5/008 | (2006.01) | |
| G11B 5/706 | (2006.01) | |
| G11B 5/78 | (2006.01) | |
| G11B 5/702 | (2006.01) | |

(52) U.S. Cl.
CPC .......... *G11B 5/708* (2013.01); *G11B 5/00817* (2013.01); *G11B 5/70* (2013.01); *G11B 5/7023* (2013.01); *G11B 5/7061* (2013.01); *G11B 5/7085* (2013.01); *G11B 5/70678* (2013.01); *G11B 5/78* (2013.01); *G11B 2220/93* (2013.01)

(58) Field of Classification Search
None
See application file for complete search history.

(56) References Cited

U.S. PATENT DOCUMENTS

| | | | |
|---|---|---|---|
| 3,966,686 A | 6/1976 | Asakura et al. | |
| 4,112,187 A | 9/1978 | Asakura et al. | |
| 4,425,404 A | 1/1984 | Suzuki et al. | |
| 4,693,930 A | 9/1987 | Kuo et al. | |
| 4,746,569 A * | 5/1988 | Takahashi | G11B 5/70 427/128 |
| 4,825,317 A | 4/1989 | Rausch | |
| 5,242,752 A | 9/1993 | Isobe et al. | |
| 5,419,938 A | 5/1995 | Kagotani et al. | |
| 5,445,881 A | 8/1995 | Irie | |
| 5,474,814 A * | 12/1995 | Komatsu | G11B 5/738 427/130 |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 7/1998 | Soui | |
| 5,827,600 A | 10/1998 | Ejiri et al. | |
| 6,099,957 A | 8/2000 | Yamamoto et al. | |
| 6,183,606 B1 | 2/2001 | Kuo et al. | |
| 6,207,252 B1 * | 3/2001 | Shimomura | G11B 5/70 428/141 |
| 6,228,461 B1 | 5/2001 | Sueki et al. | |
| 6,254,964 B1 | 7/2001 | Saito et al. | |
| 6,261,647 B1 * | 7/2001 | Komatsu | G11B 5/845 118/620 |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 * | 11/2003 | Buczek | B05D 1/40 428/323 |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,893,746 B1 | 5/2005 | Kirino et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,524,108 B2 | 9/2013 | Hattori | |
| 8,535,817 B2 * | 9/2013 | Imaoka | G11B 5/70 428/844 |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 11/2016 | Biskeborn et al. | |
| 9,530,444 B2 * | 12/2016 | Kasada | G11B 5/7085 |

(Continued)

FOREIGN PATENT DOCUMENTS

| | | |
|---|---|---|
| DE | 101 46 429 A1 | 3/2002 |
| GB | 2495356 A | 4/2013 |

(Continued)

OTHER PUBLICATIONS

English Translation of JP 61-139923 A (Year: 1986).*

(Continued)

*Primary Examiner* — Kevin M Bernatz
(74) *Attorney, Agent, or Firm* — Sughrue Mion, PLLC

(57) ABSTRACT

A magnetic tape is provided in which the total thickness of the non-magnetic layer and the magnetic layer is equal to or smaller than 0.60 μm. The magnetic layer includes ferromagnetic hexagonal ferrite powder and an abrasive. The percentage of a plan view maximum area of the abrasive confirmed in a region having a size of 4.3 μm×6.3 μm of the surface of the magnetic layer by plane observation using a scanning electron microscope, with respect to the total area of the region, is equal to or greater than 0.02% and less than 0.06%. Further, the tilt cos θ of the ferromagnetic hexagonal ferrite powder with respect to a surface of the magnetic layer acquired by cross section observation performed by using a scanning transmission electron microscope is 0.85 to 1.00.

19 Claims, 1 Drawing Sheet

(56) References Cited

U.S. PATENT DOCUMENTS

| | | | |
|---|---|---|---|
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2 * | 7/2017 | Kasada | G11B 5/7013 |
| 9,704,527 B2 | 7/2017 | Kasada | |
| 9,711,174 B2 * | 7/2017 | Kasada | G11B 5/71 |
| 9,721,605 B2 * | 8/2017 | Oyanagi | G11B 5/71 |
| 9,721,606 B2 * | 8/2017 | Kasada | G11B 5/8404 |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 | 10/2017 | Kasada et al. | |
| 9,837,104 B1 | 12/2017 | Biskeborn | |
| 9,837,116 B2 * | 12/2017 | Ozawa | G11B 5/00813 |
| 9,959,894 B2 | 5/2018 | Omura | |
| 9,972,351 B1 | 5/2018 | Tetsuya et al. | |
| 9,978,414 B1 * | 5/2018 | Kaneko | G11B 5/3909 |
| 9,984,710 B2 * | 5/2018 | Kasada | G11B 5/68 |
| 9,984,712 B1 | 5/2018 | Ozawa | |
| 9,984,716 B1 * | 5/2018 | Kaneko | G11B 5/70 |
| 10,008,230 B1 | 6/2018 | Ozawa et al. | |
| 10,026,430 B2 | 7/2018 | Kasada et al. | |
| 10,026,433 B2 | 7/2018 | Kasada et al. | |
| 10,026,434 B2 * | 7/2018 | Oyanagi | G11B 5/70 |
| 10,026,435 B2 | 7/2018 | Kasada et al. | |
| 10,062,403 B1 | 8/2018 | Kasada et al. | |
| 10,074,393 B2 * | 9/2018 | Kaneko | G11B 5/70615 |
| 10,134,433 B2 | 11/2018 | Kasada et al. | |
| 10,170,144 B2 | 1/2019 | Ozawa et al. | |
| 2001/0038928 A1 * | 11/2001 | Nakamigawa | G11B 5/70 428/832.2 |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1 * | 9/2003 | Inoue | G11B 5/735 428/845.4 |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0072025 A1 | 4/2004 | Kishimoto et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 * | 2/2006 | Kuse | G11B 5/708 428/844 |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 | 4/2010 | Nakamura | |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1 * | 1/2011 | Kaneko | C08G 73/0206 430/7 |
| 2011/0051280 A1 | 3/2011 | Karp et al. | |
| 2011/0052908 A1 | 3/2011 | Imaoka | |
| 2011/0077902 A1 | 3/2011 | Awezec et al. | |
| 2011/0151281 A1 | 6/2011 | Inoue | |
| 2011/0244272 A1 | 10/2011 | Suzuki et al. | |
| 2012/0045664 A1 * | 2/2012 | Tanaka | G11B 5/71 428/840.2 |
| 2012/0152891 A1 | 6/2012 | Brown et al. | |
| 2012/0177951 A1 | 7/2012 | Yamazaki et al. | |
| 2012/0183811 A1 | 7/2012 | Hattori et al. | |
| 2012/0196156 A1 * | 8/2012 | Suzuki | G11B 5/70 428/844 |
| 2012/0243120 A1 | 9/2012 | Harasawa et al. | |
| 2012/0244387 A1 | 9/2012 | Mori et al. | |
| 2012/0251845 A1 | 10/2012 | Wang et al. | |
| 2013/0029183 A1 | 1/2013 | Omura | |
| 2013/0084470 A1 | 4/2013 | Hattori et al. | |
| 2013/0088794 A1 | 4/2013 | Cherubini et al. | |
| 2013/0256584 A1 * | 10/2013 | Yamazaki | H01F 1/01 252/62.58 |
| 2013/0260179 A1 | 10/2013 | Kasada et al. | |
| 2013/0279040 A1 * | 10/2013 | Cideciyan | H03M 13/13 360/53 |
| 2013/0286510 A1 | 10/2013 | Rothermel et al. | |
| 2014/0011055 A1 | 1/2014 | Suzuki et al. | |
| 2014/0130067 A1 | 5/2014 | Madison et al. | |
| 2014/0139944 A1 | 5/2014 | Johnson et al. | |
| 2014/0272474 A1 * | 9/2014 | Kasada | G11B 5/7085 428/842.8 |
| 2014/0295214 A1 | 10/2014 | Tada et al. | |
| 2014/0342189 A1 | 11/2014 | Tachibana et al. | |
| 2014/0366990 A1 | 12/2014 | Lai et al. | |
| 2014/0374645 A1 | 12/2014 | Kikuchi et al. | |
| 2015/0043101 A1 | 2/2015 | Biskeborn et al. | |
| 2015/0098149 A1 | 4/2015 | Bates et al. | |
| 2015/0111066 A1 | 4/2015 | Terakawa et al. | |
| 2015/0123026 A1 | 5/2015 | Masada et al. | |
| 2015/0302879 A1 | 10/2015 | Holmberg et al. | |
| 2015/0380036 A1 | 12/2015 | Kasada et al. | |
| 2016/0061447 A1 | 3/2016 | Kobayashi | |
| 2016/0064025 A1 | 3/2016 | Kurokawa et al. | |
| 2016/0092315 A1 * | 3/2016 | Ashida | G06F 11/1469 707/684 |
| 2016/0093321 A1 | 3/2016 | Aoshima et al. | |
| 2016/0093322 A1 | 3/2016 | Kasada et al. | |
| 2016/0093323 A1 | 3/2016 | Omura | |
| 2016/0180875 A1 | 6/2016 | Tanaka et al. | |
| 2016/0189739 A1 | 6/2016 | Kasada et al. | |
| 2016/0189740 A1 | 6/2016 | Oyanagi et al. | |
| 2016/0247530 A1 | 8/2016 | Kasada | |
| 2016/0260449 A1 | 9/2016 | Ahmad et al. | |
| 2016/0276076 A1 | 9/2016 | Kasada | |
| 2017/0032812 A1 | 2/2017 | Kasada | |
| 2017/0053669 A1 | 2/2017 | Kasada | |
| 2017/0053670 A1 | 2/2017 | Oyanagi et al. | |
| 2017/0053671 A1 | 2/2017 | Kasada et al. | |
| 2017/0058227 A1 | 3/2017 | Kondo et al. | |
| 2017/0092315 A1 | 3/2017 | Ozawa et al. | |
| 2017/0130156 A1 | 5/2017 | Kondo et al. | |
| 2017/0178675 A1 | 6/2017 | Kasada | |
| 2017/0178676 A1 * | 6/2017 | Kasada | G11B 5/70626 |
| 2017/0178677 A1 | 6/2017 | Kasada | |
| 2017/0186456 A1 | 6/2017 | Tada et al. | |
| 2017/0186460 A1 | 6/2017 | Kasada et al. | |
| 2017/0221513 A1 | 8/2017 | Hiroi et al. | |
| 2017/0221516 A1 * | 8/2017 | Oyanagi | G11B 5/70 |

(56) References Cited

U.S. PATENT DOCUMENTS

| | | |
|---|---|---|
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1* | 12/2017 | Kaneko .............. G11B 5/70615 |
| 2017/0358318 A1* | 12/2017 | Kasada .............. G11B 5/00813 |
| 2017/0372726 A1* | 12/2017 | Kasada .............. G11B 5/00813 |
| 2017/0372727 A1 | 12/2017 | Kasada et al. |
| 2017/0372736 A1* | 12/2017 | Kaneko .................. G11B 5/588 |
| 2017/0372737 A1 | 12/2017 | Oyanagi et al. |
| 2017/0372738 A1 | 12/2017 | Kasada |
| 2017/0372739 A1* | 12/2017 | Ozawa ..................... G11B 5/71 |
| 2017/0372740 A1 | 12/2017 | Ozawa et al. |
| 2017/0372741 A1 | 12/2017 | Kurokawa et al. |
| 2017/0372742 A1* | 12/2017 | Kaneko .................. G11B 5/584 |
| 2017/0372743 A1* | 12/2017 | Kasada .................. G11B 5/584 |
| 2017/0372744 A1 | 12/2017 | Ozawa et al. |
| 2018/0061446 A1* | 3/2018 | Kasada .............. G11B 5/00817 |
| 2018/0061447 A1* | 3/2018 | Kasada .................... G11B 5/78 |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1* | 6/2018 | Kasada .............. G11B 5/70678 |
| 2018/0182429 A1 | 6/2018 | Kasada et al. |
| 2018/0182430 A1 | 6/2018 | Ozawa et al. |
| 2018/0182428 A1 | 7/2018 | Kasada et al. |
| 2018/0240475 A1* | 8/2018 | Kasada ..................... G11B 5/70 |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1* | 8/2018 | Kasada .................. G11B 5/712 |
| 2018/0286439 A1 | 10/2018 | Ozawa et al. |
| 2018/0286442 A1 | 10/2018 | Ozawa et al. |
| 2018/0286443 A1* | 10/2018 | Ozawa .............. G11B 5/70615 |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1* | 12/2018 | Kaneko .............. G11B 5/70615 |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |
| 2019/0295590 A1 | 9/2019 | Kaneko et al. |

FOREIGN PATENT DOCUMENTS

| | | | |
|---|---|---|---|
| JP | 61-11924 A | | 1/1986 |
| JP | 61139923 A | * | 6/1986 |
| JP | 63-129519 A | | 6/1988 |
| JP | 63-249932 A | | 10/1988 |
| JP | 64-57422 A | | 3/1989 |
| JP | 64-60819 A | | 3/1989 |
| JP | 5-258283 A | | 10/1993 |
| JP | 5-298653 A | | 11/1993 |
| JP | 7-57242 A | | 3/1995 |
| JP | 11-110743 A | | 4/1999 |
| JP | 11-175949 A | | 7/1999 |
| JP | 11-273051 A | | 10/1999 |
| JP | 2000-251240 A | | 9/2000 |
| JP | 2002-157726 A | | 5/2002 |
| JP | 2002-329605 A | | 11/2002 |
| JP | 2002-367142 A | | 12/2002 |
| JP | 2002-367318 A | | 12/2002 |
| JP | 2003-77116 A | | 3/2003 |
| JP | 2003-323710 A | | 11/2003 |
| JP | 2004-005820 A | | 1/2004 |
| JP | 2004-114492 A | | 4/2004 |
| JP | 2004-133997 A | | 4/2004 |
| JP | 2004-185676 A | | 7/2004 |
| JP | 2005-38579 A | | 2/2005 |
| JP | 2005-092967 A | | 4/2005 |
| JP | 2005-243063 A | | 9/2005 |
| JP | 2005-243162 A | | 9/2005 |
| JP | 2006-92672 A | | 4/2006 |
| JP | 2006-286114 A | | 10/2006 |
| JP | 2007-265555 A | | 10/2007 |
| JP | 2007-273039 A | | 10/2007 |
| JP | 2007-287310 A | | 11/2007 |
| JP | 2007-297427 A | | 11/2007 |
| JP | 2008-047276 A | | 2/2008 |
| JP | 2008-243317 A | | 10/2008 |
| JP | 2009-283082 A | | 12/2009 |
| JP | 2010-036350 A | | 2/2010 |
| JP | 2010-49731 A | | 3/2010 |
| JP | 2011-48878 A | | 3/2011 |
| JP | 2011-138566 A | | 7/2011 |
| JP | 2011-210288 A | | 10/2011 |
| JP | 2011-225417 A | | 11/2011 |
| JP | 2012-38367 A | | 2/2012 |
| JP | 2012-43495 A | | 3/2012 |
| JP | 2012-203955 A | | 10/2012 |
| JP | 2013-25853 A | | 2/2013 |
| JP | 2013-77360 A | | 4/2013 |
| JP | 2013-164889 A | | 8/2013 |
| JP | 2014-15453 A | | 1/2014 |
| JP | 2014-179149 A | | 9/2014 |
| JP | 2015-39801 A | | 3/2015 |
| JP | 2015-111484 A | | 6/2015 |
| JP | 2016-15183 A | | 1/2016 |
| JP | 2016-502224 A | | 1/2016 |
| JP | 2016-051493 A | | 4/2016 |
| JP | 2016-71926 A | | 5/2016 |
| JP | 2016-139451 A | | 8/2016 |

OTHER PUBLICATIONS

U.S. Appl. No. 15/422,821, Pending.
U.S. Appl. No. 15/624,897, Allowed; RCE filed Nov. 21, 2018.
U.S. Appl. No. 15/624,792, Allowed; RCE filed Nov. 21, 2018.
U.S. Appl. No. 15/626,832, Allowed; RCE filed Nov. 21, 2018.
U.S. Appl. No. 15/625,428, Allowed Dec. 4, 2018; RCE Filed.
U.S. Appl. No. 15/380,336, Allowed; RCE filed Nov. 21, 2018.

(56) References Cited

OTHER PUBLICATIONS

U.S. Appl. No. 15/614,876, Pending.
U.S. Appl. No. 15/621,464, Pending.
U.S. Appl. No. 15/854,383, Pending.
U.S. Appl. No. 15/848,173, Allowed.
U.S. Appl. No. 15/628,814, Pending.
U.S. Appl. No. 15/626,355, Pending.
U.S. Appl. No. 15/380,309, Pending.
U.S. Appl. No. 15/920,563, Allowed.
U.S. Appl. No. 15/900,230, Pending.
U.S. Appl. No. 15/900,164, Pending.
U.S. Appl. No. 15/920,518, Allowed.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 15/920,768, Allowed; RCE filed.
U.S. Appl. No. 16/009,603, Quayle Action issued (RCE filed).
U.S. Appl. No. 16/182,083, Pending (Not yet published; continuation of U.S. Appl. No. 15/920,768).
U.S. Appl. No. 16/100,289, Pending.
U.S. Appl. No. 15/900,106, Pending.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
An Office Action dated Nov. 29, 2018, which issued during the prosecution of U.S. Appl. No. 15/380,309.
An Office Action dated Nov. 29, 2018, which issued during the prosecution of U.S. Appl. No. 15/422,821.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 31, 2018 in U.S. Appl. No. 16/009,603.
U.S. Appl. No. 15/422,944, Allowed; RCE filed Nov. 21, 2018.
U.S. Appl. No. 15/625,428, Allowed Dec. 4, 2018.
U.S. Appl. No. 15/626,720, Pending.
U.S. Appl. No. 15/848,173, Pending.
U.S. Appl. No. 15/854,438, Allowed; RCE filed.
U.S. Appl. No. 15/854,409, Pending.
U.S. Appl. No. 15/920,563, Petition to Withdraw from Issue and RCE filed.
U.S. Appl. No. 15/920,768, QPIDS filed Dec. 10, 2018.
U.S. Appl. No. 16/009,603, Pending (Not yet published).
Notice of Allowance, dated Dec. 2, 2016, issued by the U.S. Patent and Trademark Office in U.S. Appl. No. 14/753,227.
Office Action dated Nov. 18, 2016 from U.S. Patent & Trademark Office in U.S. Appl. No. 14/753,227.
Office Action dated Aug. 15, 2016 from U.S. Patent & Trademark Office in U.S. Appl. No. 14/753,227.
Office Action dated Feb. 4, 2016 from U.S. Patent & Trademark Office in U.S. Appl. No. 14/753,227.
Notice of Allowance, dated Jul. 12, 2017, issued by the U.S. Patent and Trademark Office in U.S. Appl. No. 15/388,864.
Office Action dated Jun. 9, 2017 from U.S. Patent & Trademark Office in U.S. Appl. No. 15/388,864.
Office Action dated Apr. 26, 2017 from U.S. Patent & Trademark Office in U.S. Appl. No. 15/388,864.
Office Action dated Jun. 7, 2018 from U.S. Patent & Trademark Office in U.S. Appl. No. 15/380,309.
Office Action dated Aug. 3, 2018 from U.S. Patent & Trademark Office in U.S. Appl. No. 15/388,911.
Office Action dated May 30, 2018 from U.S. Patent & Trademark Office in U.S. Appl. No. 15/388,911.
Office Action dated Nov. 16, 2016 which issued during the prosecution of U.S. Appl. No. 15/072,550.
Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
Office Action dated Oct. 5, 2017, which issued during the prosecution of U.S. Appl. No. 15/241,286.
Notice of Allowance dated Mar. 21, 2018, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Notice of Allowance dated Mar. 19, 2018, which issued during the prosecution of U.S. Appl. No. 15/378,907.
Notice of Allowance dated Mar. 27, 2018, which issued during the prosecution of U.S. Appl. No. 15/241,631.
Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.
Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.
Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022.
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.
Office Action dated Nov. 28, 2018, which issued during the prosecution of U.S. Appl. No. 15/900,080.
Office Action dated Sep. 28, 2018, which issued during the prosecution of U.S. Appl. No. 15/854,409.

(56) References Cited

OTHER PUBLICATIONS

Office Action dated Oct. 15, 2018, which issued during the prosecution of U.S. Appl. No. 15/854,403.
U.S. Appl. No. 15/625,428, Pending.
Office Action dated Jul. 6, 2018, which issued during the prosecution of U.S. Appl. No. 15/848,173.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 3, 2018, which issued during the prosecution of U.S. Appl. No. 15/280,195.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/854,383.
Notice of Allowance dated Oct. 12, 2018, which issued during the prosecution of U.S. Appl. No. 15/626,832.
Notice of Allowance dated Oct. 11, 2018, which issued during the prosecution of U.S. Appl. No. 15/624,897.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/380,336.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated May 2, 2018 from the United States Patent and Trademark Office in U.S. Appl. No. 15/280,195.
Office Action dated May 4, 2018 from the United States Patent and Trademark Office in U.S. Appl. No. 15/422,821.
Office Action dated May 4, 2018 from the United States Patent and Trademark Office in U.S. Appl. No. 15/422,944.
Office Action dated May 4, 2018 from the United States Patent and Trademark Office in U.S. Appl. No. 15/625,428.
Office Action dated May 7, 2018 from the United States Patent and Trademark Office in U.S. Appl. No. 15/624,792.
Office Action dated May 7, 2018 from the United States Patent and Trademark Office in U.S. Appl. No. 15/624,897.
Office Action dated May 7, 2018 from the United States Patent and Trademark Office in U.S. Appl. No. 15/626,832.
Notice of Allowance dated Apr. 27, 2017, which issued during the prosecution of U.S. Appl. No. 15/052,115.
Notice of Allowance dated Aug. 28, 2018, which issued during the prosecution of U.S. Appl. No. 15/422,821.
Notice of Allowance dated Aug. 30, 2017, which issued during the prosecution of U.S. Appl. No. 15/466,143.
Notice of Allowance dated Jun. 2, 2017, which issued during the prosecution of U.S. Appl. No. 15/218,190.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Sep. 4, 2018, which issued during the prosecution of U.S. Appl. No. 15/625,428.
Office Action dated Aug. 23, 2018 which issued during the prosecution of U.S. Appl. No. 15/614,876.
Notice of Allowance dated Oct. 11, 2018, which issued during the prosecution of U.S. Appl. No. 15/422,944.
Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Office Action dated Dec. 21, 2018, which issued during the prosecution of U.S. Appl. No. 15/900,230.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Notice of Allowance dated Aug. 27, 2018 in U.S. Appl. No. 15/920,635.
Office Action dated Dec. 19, 2018 in U.S. Appl. No. 15/900,345.
Office Action dated Dec. 19, 2018 in U.S. Appl. No. 15/900,379.
Office Action dated Dec. 21, 2018 in U.S. Appl. No. 15/900,160.
Office Action dated Dec. 7, 2018 in U.S. Appl. No. 15/920,592.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Nov. 19, 2018 in U.S. Appl. No. 15/900,141.
Notice of Allowance dated Mar. 5, 2019 in U.S. Appl. No. 16/009,603.
Office Action dated Dec. 20, 2018 in U.S. Appl. No. 15/900,242.
Office Action dated Dec. 21, 2018 in U.S. Appl. No. 15/920,616.
Office Action dated Dec. 27, 2018 in U.S. Appl. No. 15/900,334.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.
"Introduction to TMR Magnetic Sensors", Anonymous, Mar. 12, 2015, MR Sensor Technology, pp. 1-5 (Year: 2015).
Office Action dated Mar. 5, 2019 in U.S. Appl. No. 15/443,026.
Office Action dated Mar. 6, 2019 in U.S. Appl. No. 15/854,403.
Office Action dated Mar. 7, 2019 in U.S. Appl. No. 15/854,439.
Office Action dated Dec. 20, 2018 in U.S. Appl. No. 15/900,106.
Notice of Allowance dated Mar. 13, 2019 in U.S. Appl. No. 16/100,289.
U.S. Appl. No. 15/422,944, Allowed.

(56) References Cited

OTHER PUBLICATIONS

U.S. Appl. No. 15/624,897, Pending.
U.S. Appl. No. 15/624,792, Pending.
U.S. Appl. No. 15/626,832, Pending.
U.S. Appl. No. 15/620,916, Pending.
U.S. Appl. No. 15/626,720, Allowed.
U.S. Appl. No. 15/854,439, Pending.
U.S. Appl. No. 15/628,814, Allowed; RCE filed.
U.S. Appl. No. 15/626,355, Allowed; RCE filed.
U.S. Appl. No. 15/854,438, Allowed.
U.S. Appl. No. 15/854,409, Allowed.
U.S. Appl. No. 15/900,144, Pending.
U.S. Appl. No. 15/900,080, Pending.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 16/100,289, Allowed; RCE filed.
U.S. Appl. No. 15/900,141, Pending.
U.S. Appl. No. 15/920,592, Pending.
U.S. Appl. No. 16/160,377, Pending.
U.S. Appl. No. 16/184,312, Pending.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Mar. 18, 2019 in U.S. Appl. No. 15/628,814.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Apr. 4, 2019 in U.S. Appl. No. 16/184,312.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Notice of Allowance dated Mar. 18, 2019 in U.S. Appl. No. 15/626,355.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated May 23, 2019 in U.S. Appl. No. 15/388,911.
Notice of Allowance dated Jun. 6, 2019 in U.S. Appl. No. 15/854,383.
Office Action dated Jun. 6, 2019 in U.S. Appl. No. 15/899,587.
Office Action dated Jun. 10, 2019 in U.S. Appl. No. 15/920,518.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Office Action dated Jul. 16, 2019 in Japanese Application No. 2016-124933.
Office Action dated Jun. 25, 2019 in Japanese Application No. 2015-245144.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Pending.
U.S. Appl. No. 15/422,821, Allowed.
U.S. Appl. No. 15/422,944, Patented as U.S. Pat. No. 10,347,279.
U.S. Appl. No. 15/466,143, Patented as U.S. Pat. No. 9,837,116.
U.S. Appl. No. 15/619,012, Pending.
U.S. Appl. No. 15/624,897, Allowed.
U.S. Appl. No. 15/624,792, Allowed.
U.S. Appl. No. 15/626,832, Allowed.
U.S. Appl. No. 15/625,428, Allowed.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Pending.
U.S. Appl. No. 15/614,876, Allowed.
U.S. Appl. No. 15/620,916, Allowed.
U.S. Appl. No. 15/621,464, Allowed.
U.S. Appl. No. 15/626,720, Patented as U.S. Pat. No. 10,347,280.
U.S. Appl. No. 15/854,383, Allowed.
U.S. Appl. No. 15/854,507, Patented as U.S. Pat. No. 9,984,716.
U.S. Appl. No. 15/854,439, Allowed.
U.S. Appl. No. 15/854,506, Patented as U.S. Pat. No. 10,008,230.
U.S. Appl. No. 15/848,173, Allowed; QPIDS filed.
U.S. Appl. No. 15/628,814, Allowed.
U.S. Appl. No. 15/690,400, Pending.
U.S. Appl. No. 15/690,906, Pending.
U.S. Appl. No. 15/626,355, Allowed.
U.S. Appl. No. 15/627,696, Pending.
U.S. Appl. No. 14/870,618, Patented as U.S. Pat. No. 9,959,894.
U.S. Appl. No. 15/388,911, Pending.
U.S. Appl. No. 14/753,227, Patented as U.S. Pat. No. 9,601,146.
U.S. Appl. No. 15/380,309, Allowed.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,433.

(56) References Cited

OTHER PUBLICATIONS

U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Allowed; QPIDS filed.
U.S. Appl. No. 15/854,409, Allowed; QPIDS filed.
U.S. Appl. No. 15/443,026, Pending.
U.S. Appl. No. 15/920,782, Patented as U.S. Pat. No. 10,134,433.
U.S. Appl. No. 15/920,563, Allowed; QPIDS filed.
U.S. Appl. No. 15/920,533, Pending.
U.S. Appl. No. 15/900,144, Allowed.
U.S. Appl. No. 15/900,080, Allowed.
U.S. Appl. No. 15/900,230, Allowed.
U.S. Appl. No. 15/900,164, Allowed.
U.S. Appl. No. 15/920,518, Pending.
U.S. Appl. No. 15/899,587, Pending.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed; QPIDS filed.
U.S. Appl. No. 16/009,603, Patented as U.S. Pat. No. 10,366,721.
U.S. Appl. No. 16/182,083, Allowed (Continuation of U.S. Appl. No. 15/920,768).
U.S. Appl. No. 15/705,531, Pending.
U.S. Appl. No. 16/232,165, Pending (Continuation of U.S. Appl. No. 15/854,438).
U.S. Appl. No. 16/100,289, Allowed.
U.S. Appl. No. 16/038,669, Pending.
U.S. Appl. No. 15/900,106, Allowed.
U.S. Appl. No. 15/900,412, Patented as U.S. Pat. No. 10,062,403.
U.S. Appl. No. 15/900,141, Allowed.
U.S. Appl. No. 15/900,160, Allowed.
U.S. Appl. No. 15/900,345, Allowed.
U.S. Appl. No. 15/900,379, Allowed.
U.S. Appl. No. 16/012,018, Pending.
U.S. Appl. No. 15/920,616, Allowed.
U.S. Appl. No. 15/900,242, Allowed.
U.S. Appl. No. 15/900,334, Allowed.
U.S. Appl. No. 15/920,592, Allowed.
U.S. Appl. No. 15/920,635, Patented as U.S. Pat. No. 10,170,144.
U.S. Appl. No. 16/160,377, Allowed.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Allowed.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Allowed.
U.S. Appl. No. 16/142,560, Pending.
U.S. Appl. No. 16/184,312, Allowed.
U.S. Appl. No. 16/143,646, Allowed.
U.S. Appl. No. 16/144,428, Pending.
U.S. Appl. No. 16/143,747, Pending.
U.S. Appl. No. 16/440,161, Pending.
U.S. Appl. No. 16/144,605, Pending.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Aug. 6, 2019 in Japanese Application No. 2016-254421.
Office Action dated Aug. 6, 2019 in Japanese Application No. 2016-254427.
Office Action dated Sep. 17, 2019 in Japanese Application No. 2017-029499.
Office Action dated Sep. 3, 2019 in Japanese Application No. 2016-254434.

\* cited by examiner

MAGNETIC TAPE HAVING CHARACTERIZED MAGNETIC LAYER

CROSS-REFERENCE TO RELATED APPLICATIONS

This application claims priority under 35 U.S.C 119 to Japanese Patent Application No. 2016-169851 filed on Aug. 31, 2016. The above application is hereby expressly incorporated by reference, in its entirety.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for data storage such as data back-up. The recording and/or reproducing of signals to the magnetic tape are normally performed by mounting a magnetic tape cartridge including the magnetic tape on a drive, allowing the magnetic tape to run in the drive, and bringing the surface of the magnetic tape (surface of a magnetic layer) to come into contact with a magnetic head to slide thereon. Hereinafter, the magnetic tape is simply referred to as a "tape" and the magnetic head is also simply referred to as a "head".

For example, in order to continuously or intermittently repeatedly reproduce the signal recorded in the magnetic tape, repeated running of the magnetic tape is performed in the drive (hereinafter, also simply referred to as "repeated running"). It is desired that a deterioration of electromagnetic conversion characteristics during such repeated running is prevented, from a viewpoint of increasing reliability of the magnetic tape for data storage use. This is because a magnetic tape, in which electromagnetic conversion characteristics during the repeated running are hardly deteriorated, can continuously exhibit excellent electromagnetic conversion characteristics, even when the running is continuously or intermittently repeated in a drive.

As a reason of a deterioration of electromagnetic conversion characteristics due to the repeated running, occurrence of a phenomenon (called a "spacing loss") in which a distance between a surface of a magnetic layer and a head is widened, is exemplified. As a reason of this spacing loss, attachment of foreign materials derived from a tape to a head, while a surface of a magnetic layer and a head continue the sliding during the repeated running, that is, generation of head attached materials is exemplified. In the related art, as a measure against the generation of the head attached materials, an abrasive has been included in the magnetic layer, in order to impart a function of removing the head attached materials to the surface of the magnetic layer (for example, see JP2014-179149A). Hereinafter, the function of the surface of the magnetic layer of removing the head attached materials is referred to as "abrasion properties of the surface of the magnetic layer" or simply "abrasion properties".

SUMMARY OF THE INVENTION

JP2014-179149A discloses that a magnetic tape disclosed in JP2014-179149A can exhibit excellent electromagnetic conversion characteristics. In order to increase reliability of such a magnetic tape capable of exhibiting excellent electromagnetic conversion characteristics, for use of data storage, it is desired that a deterioration of electromagnetic conversion characteristics during the repeated running is prevented. Therefore, the inventor has made intensive research in order to find means for preventing a deterioration of electromagnetic conversion characteristics during the repeated running of the magnetic tape. From such research, the inventor has focused that, not only generation of head attached materials is a reason of spacing loss, but also partial chipping of a head can be a reason of spacing loss. Specific description is as follows. By increasing abrasion properties of a surface of a magnetic layer, the spacing loss caused by the head attached materials can be reduced. However, as abrasion properties of the surface of the magnetic layer increase, the head easily partially chips due to the sliding between the surface of the magnetic layer and the head. In a case where partial chipping of the head occurs, a distance between the surface of the magnetic layer and the head in the chipped portion is widened. This may also be a reason of the spacing loss.

In regards to abrasion properties of the surface of the magnetic layer, as disclosed in JP2014-179149A, as an abrasive is present in the magnetic layer in a fine state, abrasion properties tend to be deteriorated. The partial chipping of the head can be prevented by the deterioration of the abrasion properties, but the head attached materials are hardly removed. As described above, the removal of the head attached materials and the partial chipping of the head are in a relationship of the tradeoff.

Meanwhile, in order to increase recording capacity for 1 reel of a magnetic tape cartridge, it is desired to increase the total length of the magnetic tape accommodated in 1 reel of the magnetic tape cartridge by decreasing the total thickness of the magnetic tape (that is, thinning the magnetic tape). As one method of thinning the magnetic tape, a method of decreasing the total thickness of a non-magnetic layer and a magnetic layer of a magnetic tape including the non-magnetic layer and the magnetic layer on a non-magnetic support in this order is used. However, in such studies of the inventor, it was clear that, it was difficult to overcome the relationship of the tradeoff to prevent a deterioration of electromagnetic conversion characteristics during the repeated running in a low temperature and high humidity environment, in a magnetic tape having a decreased total thickness of a non-magnetic layer and a magnetic layer which is equal to or smaller than 0.60 μm, compared to a magnetic tape having the total thickness of a non-magnetic layer and a magnetic layer which exceeds 0.60 μm. Hereinafter, the deterioration of electromagnetic conversion characteristics indicates a deterioration of electromagnetic conversion characteristics in a low temperature and high humidity environment, unless otherwise noted. The low temperature and high humidity environment can be, for example, an environment in which an atmosphere temperature is 10° C. to 20° C. and a relative humidity is 70% to 90%. The magnetic tape may also be used in the low temperature and high humidity environment, and therefore, it is desired that a deterioration of electromagnetic conversion characteristics during the repeated running is prevented in such an environment.

Therefore, an object of the invention is to provide a magnetic tape which has the total thickness of a non-magnetic layer and a magnetic layer equal to or smaller than 0.60 μm and in which electromagnetic conversion characteristics are hardly deteriorated, even when the running is repeated in a low temperature and high humidity environment.

According to one aspect of the invention, there is provided a magnetic tape comprising: a non-magnetic support; a non-magnetic layer including non-magnetic powder and a binding agent on the non-magnetic support; and a magnetic layer including ferromagnetic powder and a binding agent on the non-magnetic layer, in which the total thickness of the non-magnetic layer and the magnetic layer is equal to or smaller than 0.60 μm, the ferromagnetic powder is ferromagnetic hexagonal ferrite powder, the magnetic layer includes an abrasive, a percentage of a plan view maximum area of the abrasive confirmed in a region having a size of 4.3 μm×6.3 μm of the surface of the magnetic layer by plane observation using a scanning electron microscope, with respect to the total area of the region is equal to or greater than 0.02% and less than 0.06%, and a tilt cos θ (hereinafter, also simply referred to as a "cos θ") of the ferromagnetic hexagonal ferrite powder with respect to a surface of the magnetic layer acquired by cross section observation performed by using a scanning transmission electron microscope is 0.85 to 1.00.

In one aspect, a Brunauer-Emmett-Teller (BET) specific surface area of the abrasive is in a range of 14 to 40 m$^2$/g. The BET specific surface area is a specific surface area measured by a BET method regarding primary particles.

In one aspect, the abrasive is alumina powder.

In one aspect, the cos θ is 0.89 to 1.00.

In one aspect, the cos θ is 0.95 to 1.00.

In one aspect, the magnetic layer includes a polyester chain-containing compound having a weight-average molecular weight of 1,000 to 80,000.

In one aspect, an activation volume of the ferromagnetic hexagonal ferrite powder is 800 nm$^3$ to 2,500 nm$^3$.

In one aspect, the percentage of a plan view maximum area of the abrasive confirmed in a region having a size of 4.3 μm×6.3 μm of the surface of the magnetic layer by plane observation using a scanning electron microscope, with respect to the total area of the region is 0.02% to 0.05%.

In one aspect, the total thickness of the non-magnetic layer and the magnetic layer is 0.20 μm to 0.60 μm.

In one aspect, the magnetic layer includes an aromatic hydrocarbon compound including a phenolic hydroxyl group.

In one aspect, the ferromagnetic hexagonal ferrite powder includes Al.

According to one aspect of the invention, it is possible to provide a magnetic tape which has the total thickness of a non-magnetic layer and a magnetic layer equal to or smaller than 0.60 μm and in which electromagnetic conversion characteristics during the repeated running are hardly deteriorated in a low temperature and high humidity environment.

DESCRIPTION OF THE PREFERRED EMBODIMENTS

Figure 1:
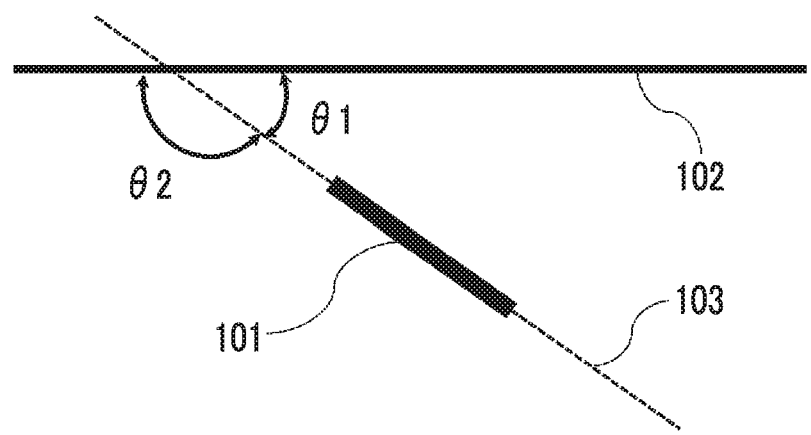
FIG. 1 is an explanatory diagram of an angle θ regarding a cos θ.

According to one aspect of the invention, there is provided a magnetic tape including: a non-magnetic support; a non-magnetic layer including non-magnetic powder and a binding agent on the non-magnetic support; and a magnetic layer including ferromagnetic powder and a binding agent on the non-magnetic layer, in which the total thickness of the non-magnetic layer and the magnetic layer is equal to or smaller than 0.60 μm, the ferromagnetic powder is ferromagnetic hexagonal ferrite powder, the magnetic layer includes an abrasive, a percentage of a plan view maximum area of the abrasive confirmed in a region having a size of 4.3 μm×6.3 μm of the surface of the magnetic layer by plane observation using a scanning electron microscope, with respect to the total area of the region is equal to or greater than 0.02% and less than 0.06%, and a tilt cos θ of the ferromagnetic hexagonal ferrite powder with respect to a surface of the magnetic layer acquired by cross section observation performed by using a scanning transmission electron microscope is 0.85 to 1.00.

The following description contains surmise of the inventor. The invention is not limited by such surmise.

The surmise of the inventor regarding the magnetic tape is as follows.

(1) As described above, it was clear that, it was difficult to prevent a deterioration of electromagnetic conversion characteristics during the repeated running in a low temperature and high humidity environment, in a magnetic tape having a decreased total thickness of a non-magnetic layer and a magnetic layer which is equal to or smaller than 0.60 μm, compared to a magnetic tape having the total thickness of a non-magnetic layer and a magnetic layer which exceeds 0.60 μm. The reason thereof may be a change of a contact state between the surface of the magnetic layer and the head due to a decrease of only the total thickness of the non-magnetic layer and the magnetic layer. Due to such a change of the contact state, the inventor has surmised that a phenomenon that the head easily partially chips due to the abrasive present in the magnetic layer may be one of the reasons of the spacing loss. In regards to this point, the inventor has considered that a state of the abrasive present in the magnetic layer which is in a state satisfying a percentage which will be described later in detail, indicates that the abrasive is present in the magnetic layer in a fine state. The inventor has surmised that this contributes to the prevention of partial chipping of the head during the repeated running.

(2) However, when the abrasive is only simply present in the magnetic layer in a fine state, abrasion properties of the surface of the magnetic layer are deteriorated. That is, a function of removing head attached materials by the surface of the magnetic layer is deteriorated. In regards to this point, the inventor has considered that, the ferromagnetic hexagonal ferrite powder present in the magnetic layer in a state where the cos θ is in the range described above, contributes to the preventing of the abrasive present in the vicinity of the surface of the magnetic layer from being pressed into the magnetic layer at the time of the sliding between the surface of the magnetic layer and the head. Accordingly, the inventor has surmised that, even in a case where the abrasive is present in the magnetic layer in a fine state, it is possible to exhibit an excellent function of removing head attached materials by the abrasive. Specific descriptions will be described later.

The inventor has surmised that, as a result of reducing the spacing loss by satisfying both of the prevention of partial chipping of the head and the removal of the head attached materials as described above, it is possible to prevent a deterioration of electromagnetic conversion characteristics during the repeated running in the magnetic tape having a decreased total thickness of the non-magnetic layer and the magnetic layer which is equal to or smaller than 0.60 µm.

However, the invention is not limited to the surmises described above.

Hereinafter, the magnetic tape will be described more specifically.

In the invention and the specification, the "surface of the magnetic layer" is identical to the surface of the magnetic tape on the magnetic layer side. In the invention and the specification, the "ferromagnetic hexagonal ferrite powder" means an aggregate of a plurality of ferromagnetic hexagonal ferrite particles. Hereinafter, particles (ferromagnetic hexagonal ferrite particles) configuring the ferromagnetic hexagonal ferrite powder are also referred to as "hexagonal ferrite particles" or simply "particles". The "aggregate" not only includes an aspect in which particles configuring the aggregate directly come into contact with each other, but also includes an aspect in which a binding agent, an additive, or the like is interposed between the particles. The points described above are also applied to various powder forms such as non-magnetic powder of the invention and the specification, in the same manner.

Total Thickness of Non-Magnetic Layer and Magnetic Layer

The total thickness of the non-magnetic layer and the magnetic layer of the magnetic tape is equal to or smaller than 0.60 µm and preferably equal to or smaller than 0.50 µm, from a viewpoint of thinning the magnetic tape. In addition, the total thickness of the non-magnetic layer and the magnetic layer is, for example, equal to or greater than 0.10 µm or equal to or greater than 0.20 µm.

Various thicknesses such as a thickness of the non-magnetic layer and a thickness of the magnetic layer will be described later in detail. The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

State of Abrasive Present in Magnetic Layer

The magnetic tape includes an abrasive in the magnetic layer. The abrasive is present in the magnetic layer in a state where a percentage of a plan view maximum area of the abrasive confirmed in a region having a size of 4.3 µm×6.3 µm of the surface of the magnetic layer by plane observation using a scanning electron microscope (SEM), with respect to the total area (100%) of the region is equal to or greater than 0.02% and less than 0.06%. The inventor has surmised that the abrasive present in the magnetic layer in a state where the percentage of the plan view maximum area of the abrasive with respect to the total area of the region (hereinafter, also referred to as a "plan view maximum area percentage of the abrasive" or simply a "percentage") is equal to or greater than 0.02% contributes to the removal of the head attached materials, and the abrasive present in the magnetic layer in a state where the percentage is less than 0.06% contributes to the prevention of partial chipping of the head. Accordingly, the inventor has surmised that, the prevention of occurrence of spacing loss contributes to the prevention of a deterioration of electromagnetic conversion characteristics during the repeated running in a low temperature and high humidity environment. The percentage is preferably 0.02% to 0.05% and more preferably 0.02% to 0.04%.

As a result of the intensive studies of the inventor, it was clear that, in the magnetic tape having the total thickness of the non-magnetic layer and the magnetic layer equal to or smaller than 0.60 µm, in addition to allowing the abrasive to be present in the magnetic layer in a state where the percentage is equal to or greater than 0.02% and less than 0.06%, allowing the ferromagnetic hexagonal ferrite powder to be present in the magnetic layer in a state where the cos θ is 0.85 to 1.00 also contributes to the prevention of a deterioration of electromagnetic conversion characteristics during the repeated running in a low temperature and high humidity environment. This point will be described later in detail.

Measurement Method

The plan view maximum area of the abrasive described above is acquired by plane observation performed by using a scanning electron microscope. As the scanning electron microscope, a field emission (FE) type scanning electron microscope (FE-SEM) is used. A scanning electron microscope image (SEM image) obtained by plane-observing and imaging the surface of the magnetic layer from the top by using the FE-SEM under the conditions of an acceleration voltage of 5 kV, a working distance (W.D.) of 8 mm, and a magnification ratio of imaging of 20,000 times, is analyzed and accordingly, the plan view maximum area of the abrasive is acquired. The percentage is calculated from the acquired plan view maximum area. Specific procedure is as follows.

1. Acquiring of SEM Image

An acceleration voltage is set as 5 kV, a working distance (W.D.) is set as 8 mm, and a magnification ratio of imaging is set as 20,000 times, and a SEM image is acquired as a secondary electron image, without performing a sample coating before the imaging. As the scanning electron microscope (FE-SEM), FE-SEM 54800 manufactured by Hitachi, Ltd. can be used, for example. Values of Examples and Comparative Examples which will be described later are values obtained by using FE-SEM 54800 manufactured by Hitachi, Ltd. as the FE-SEM and setting a probe current as Normal.

2. Image Analysis

The image analysis of the SEM image acquired in the section 1. is performed by the following procedure by using WinROOF manufactured by Mitani Corporation as image analysis software. An area of each portion described below is acquired as a value using a pixel as a unit.

(1) The image data (SEM (20K) jpg image) of the SEM image acquired in the section 1. is dragged-and-dropped in WinROOF.

(2) A region having a size of 4.3 µm×6.3 µm of the image excluding a part where a magnification and a scale are displayed, is selected as an analysis region.

(3) The image in the analysis region is subjected to binarization processing. Specifically, 150 gradation is selected as a lower limit value, 255 gradation is selected as an upper limit value, and the binarization processing is performed by setting the lower limit value and the upper limit value as threshold values.

(4) By performing the binarization processing, an area of each white shining portion of the analysis region is acquired.

Specifically, a command of measurement→shape characteristics→area is executed in the image analysis software WinROOF.

(5) The total area (4.3 μm×6.3 μm) of the analysis region is set as 100%, a percentage of the area of each portion acquired in (4) with respect to the total area is calculated, and a maximum value of the percentage of the area of each portion is acquired.

(6) The procedure of (2) to (5) is executed four times by changing the position of the analysis region (N=4).

(7) An arithmetical mean (that is, arithmetical mean of four maximum values) of the maximum values respectively acquired in (5) during the execution of the procedure four times is calculated, and the calculated value is set as the plan view maximum area of the abrasive. A percentage of the plan view maximum area acquired as described above occupying the total area of the analysis region is calculated and the calculated percentage is set as the plan view maximum area percentage of the abrasive.

Adjustment Method

By allowing the abrasive to be present in the magnetic layer in a fine state, it is possible to realize a state where the abrasive is present in the magnetic layer in a state where the percentage is equal to or greater than 0.02% and less than 0.06%. In order to allow the abrasive to be present in the magnetic layer in a fine state, it is preferable that an abrasive having a small particle size is used, the aggregate of the abrasive is prevented and the abrasive is dispersed in the magnetic layer without being unevenly distributed. As one method thereof, a method of reinforcing the dispersion conditions of the abrasive at the time of preparing a magnetic layer forming composition is used. For example, separate dispersing the abrasive and the ferromagnetic powder is one aspect of the reinforcement of the dispersion conditions. The separate dispersing is more specifically a method of preparing a magnetic layer forming composition through a step of mixing an abrasive liquid including an abrasive and a solvent (here, substantially not including ferromagnetic powder) with a magnetic solution including the ferromagnetic powder, a solvent, and a binding agent. By performing the mixing after separately dispersing the abrasive and the ferromagnetic powder as described above, it is possible to increase dispersibility of the abrasive of the magnetic layer forming composition. The expression of "substantially not including ferromagnetic powder" means that the ferromagnetic powder is not added as a constituent component of the abrasive liquid, and a small amount of the ferromagnetic powder present as impurities being mixed without intention is allowed. By arbitrarily combining methods such as use of dispersion media having a small size (for example, decreasing a diameter of dispersion beads in beads dispersion), a high degree of filling of dispersion media of a dispersion device, and a dispersing process performed for a long time, other than the separate dispersing or in addition to the separate dispersing, it is possible to reinforce the dispersion conditions.

In addition, the use of a dispersing agent for improving dispersibility of the abrasive can also be one aspect of the reinforcement of the dispersion conditions of the abrasive. Here, the dispersing agent for improving dispersibility of the abrasive is a component which can increase dispersibility of the abrasive in the magnetic layer forming composition and/or the abrasive liquid, compared to a state where this agent is not present. As a compound which can function as such a dispersing agent, an aromatic hydrocarbon compound including a phenolic hydroxyl group can be used. The "phenolic hydroxyl group" is a hydroxyl group directly combined with an aromatic ring. The aromatic ring included in the aromatic hydrocarbon compound may have a monocyclic or polycyclic structure, or may a fused ring. From a viewpoint of improving dispersibility of the abrasive, an aromatic hydrocarbon compound including a benzene ring or a naphthalene ring is preferable. In addition, the aromatic hydrocarbon compound may include a substituent other than the phenolic hydroxyl group. Examples of the substituent other than the phenolic hydroxyl group include a halogen atom, an alkyl group, an alkoxy group, an amino group, an acyl group, a nitro group, a nitroso group, and a hydroxyalkyl group, and a halogen atom, an alkyl group, an alkoxy group, an amino group, and a hydroxyalkyl group are preferable. The phenolic hydroxyl group included in one molecule of the aromatic hydrocarbon compound may be 1, 2, 3, or more.

As one preferable aspect of the aromatic hydrocarbon compound including a phenolic hydroxyl group, a compound represented by General Formula 100.

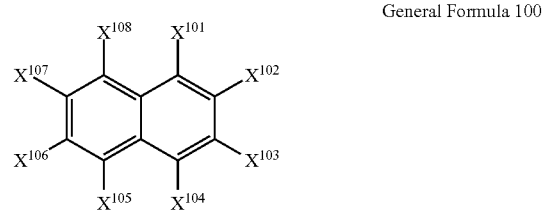

General Formula 100

[In General Formula 100, two of $X^{101}$ to $X^{108}$ are hydroxyl groups and other six components each independently represent a hydrogen atom or a substituent.]

In the compound represented by General Formula 100, a site of substitution of the two hydroxyl groups (phenolic hydroxyl groups) is not particularly limited.

In the compound represented by General Formula 100, two of $X^{101}$ to $X^{108}$ are hydroxyl groups (phenolic hydroxyl groups) and other six components each independently represent a hydrogen atom or a substituent. In addition, among $X^{101}$ to $X^{108}$, all of portions other than the two hydroxyl groups may be hydrogen atoms or some or all of the portions may be substituents. As the substituent, the substituents described above can be used. As the substituent other than the two hydroxyl groups, one or more phenolic hydroxyl groups may be included. From a viewpoint of improving dispersibility of the abrasive, it is preferable that the components other than the two hydroxyl groups among $X^{101}$ to $X^{108}$ are not phenolic hydroxyl groups. That is, the compound represented by General Formula 100 is preferably dihydroxynaphthalene or a derivative thereof and more preferably 2,3-dihydroxynaphthalene or a derivative thereof. Examples of a preferable substituent as the substituent represented by $X^{101}$ to $X^{108}$ include a halogen atom (for example, a chlorine atom, a bromine atom), an amino group, an alkyl group having 1 to 6 (preferably 1 to 4) carbon atoms, a methoxy group and an ethoxy group, an acyl group, a nitro group, a nitroso group, and a —CH$_2$OH group.

As the dispersing agent for improving dispersibility of the abrasive, descriptions disclosed in paragraphs 0024 to 0028 of JP2014-179149A can be referred to.

The content of the dispersing agent for improving dispersibility of the abrasive described above can be used, for example, 0.5 to 20.0 parts by mass and is preferably 1.0 to 10.0 parts by mass with respect to 100.0 parts by mass of the abrasive, at the time of preparing the magnetic layer forming composition, preferably at the time of preparing the abrasive liquid.

The "abrasive" means non-magnetic powder having Mohs hardness exceeding 8 and is preferably non-magnetic powder having Mohs hardness equal to or greater than 9. The abrasive may be powder of inorganic substances (inorganic powder) or may be powder of organic substances (organic powder). The abrasive is more preferably inorganic powder having Mohs hardness exceeding 8 and even more preferably inorganic powder having Mohs hardness equal to or greater than 9. A maximum value of Mohs hardness is 10 of diamond. Specifically, powders of alumina ($Al_2O_3$), silicon carbide, boron carbide ($B_4C$), TiC, cerium oxide, zirconium oxide ($ZrO_2$), diamond, and the like can be used as the abrasive, and among these, alumina powder is preferable. The aromatic hydrocarbon compound including a phenolic hydroxyl group described above is particularly preferably used as a dispersing agent for improving dispersibility of alumina powder. There are mainly two kinds of alumina having an alpha type crystal form and a gamma type crystal form. Both can be used, it is preferable to use alumina (α-alumina) having an alpha type crystal form, from viewpoints of realizing higher hardness and contributing to the improvement of abrasion properties and the improvement of the strength of the magnetic layer. A gelatinization ratio of α-alumina is preferably equal to or greater than 50% from a viewpoint of hardness. The shape of the particles of the abrasive may be any shape of an acicular shape, a spherical shape, and a dice shape.

In order to obtain a magnetic layer in which the abrasive is present in a fine state, it is preferable to use an abrasive having a small particle size as the abrasive. As an index of the particle size of the abrasive, a BET specific surface area can be used. A large BET specific surface area means a small particle size. From a viewpoint of a small particle size, the BET specific surface area of the abrasive is preferably equal to or greater than 14 $m^2/g$, more preferably equal to or greater than 15 $m^2/g$, even more preferably equal to or greater than 18 $m^2/g$, and still more preferably equal to or greater than 20 $m^2/g$. In addition, from a viewpoint of ease of improvement of dispersibility, an abrasive having a BET specific surface area equal to or smaller than 40 $m^2/g$ is preferably used.

A preparing method of the magnetic layer forming composition including the abrasive will be described later in detail.

cos θ

In the magnetic tape, the tilt cos θ of the ferromagnetic hexagonal ferrite powder with respect to the surface of the magnetic layer acquired by the cross section observation performed by using a scanning transmission electron microscope is 0.85 to 1.00. The cos θ is more preferably equal to or greater than 0.89, even more preferably equal to or greater than 0.90, still more preferably equal to or greater than 0.92, and still even more preferably equal to or greater than 0.95. Meanwhile, in a case where all of the hexagonal ferrite particles having an aspect ratio and a length in a long axis direction which will be described later are present to be parallel to the surface of the magnetic layer, the cos θ becomes 1.00 which is the maximum value. According to the research of the inventor, it is found that, as the value of the cos θ increases, a deterioration of electromagnetic conversion characteristics during the repeated running tends to be prevented. That is, in the magnetic tape having the total thickness of the non-magnetic layer and the magnetic layer equal to or smaller than 0.60 μm, a great value of the cos θ is preferable, from a viewpoint of preventing a deterioration of electromagnetic conversion characteristics during the repeated running. Accordingly, in the magnetic tape, the upper limit of the cos θ is equal to or smaller than 1.00. The cos θ may be, for example, equal to or smaller than 0.99. However, as described above, a great value of the cos θ is preferable, and thus, the cos θ may exceed 0.99.

Measurement Method

The cos θ is acquired by the cross section observation performed by using a scanning transmission electron microscope (STEM). The cos θ of the invention and the specification is a value acquired by the following method.

(1) A cross section observation sample is manufactured by performing the cutting out from an arbitrarily determined position of the magnetic tape which is a target for acquiring the cos θ. The manufacturing of the cross section observation sample is performed by focused ion beam (FIB) processing using a gallium ion ($Ga^+$) beam. A specific example of such a manufacturing method will be described later with Examples.

(2) The manufactured cross section observation sample is observed with the STEM, and a STEM images are captured. The STEM images are captured at positions of the same cross section observation sample arbitrarily selected, except for selecting so that the imaging ranges are not overlapped, and total 10 images are obtained. The STEM image is a STEM-high-angle annular dark field (HAADF) image which is captured at an acceleration voltage of 300 kV and a magnification ratio of imaging of 450,000, and the imaging is performed so that entire region of the magnetic layer in a thickness direction is included in one image. The entire region of the magnetic layer in the thickness direction is a region from the surface of the magnetic layer observed in the cross section observation sample to an interface between the magnetic layer and the adjacent layer, and is normally a region therefrom to an interface of the non-magnetic layer.

(3) In each STEM image obtained as described above, a linear line connecting both ends of a line segment showing the surface of the magnetic layer is determined as a reference line. In a case where the STEM image is captured so that the magnetic layer side of the cross section observation sample is positioned on the upper side of the image and the non-magnetic support side is positioned on the lower side, for example, the linear line connecting both ends of the line segment described above is a linear line connecting an intersection between a left side of the image (normally, having a rectangular or square shape) of the STEM image and the line segment, and an intersection between a right side of the STEM image and the line segment to each other.

(4) Among the hexagonal ferrite particles observed in the STEM image, an angle θ formed by the reference line and the long axis direction of the hexagonal ferrite particles (primary particles) having an aspect ratio in a range of 1.5 to 6.0 and a length in the long axis direction equal to or greater than 10 nm is measured, and regarding the measured angle θ, the cos θ is calculated as a cos θ based on a unit circle. The calculation of the cos θ is performed with 30 particles arbitrarily extracted from the hexagonal ferrite particles having the aspect ratio and the length in the long axis direction in each STEM image.

(5) The measurement and the calculation are respectively performed for 10 images, the values of the acquired cos θ of the 30 hexagonal ferrite particles of each image, that is, 300 hexagonal ferrite particles in total of the 10 images, are averaged. The arithmetical mean acquired as described above is set as the tilt cos θ of the ferromagnetic hexagonal ferrite powder with respect to the surface of the magnetic layer acquired by the cross section observation performed by using the scanning transmission electron microscope.

Here, the "aspect ratio" observed in the STEM image is a ratio of "length in the long axis direction/length in a short axis direction" of the hexagonal ferrite particles.

The "long axis direction" means a direction when an end portion close to the reference line and an end portion far from the reference line are connected to each other, among the end portions which are most separated from each other, in the image of one hexagonal ferrite particle observed in the STEM image. In a case where a line segment connecting one end portion and the other end portion is parallel with the reference line, a direction parallel to the reference line becomes the long axis direction.

The "length in the long axis direction" means a length of a line segment drawn by connecting end portions which are most separated from each other, in the image of one hexagonal ferrite particle observed in the STEM image. Meanwhile, the "length in the short axis direction" means a length of the longest line segment, among the line segments connecting two intersections between an outer periphery of the image of the particle and a perpendicular line with respect to the long axis direction.

In addition, the angle θ formed by the reference line and the tilt of the particle in the long axis direction is determined to be in a range of 0° to 90°, by setting an angle of the long axis direction parallel to the reference line as 0°. Hereinafter, the angle θ will be further described with reference to the drawings.

Figure 2:
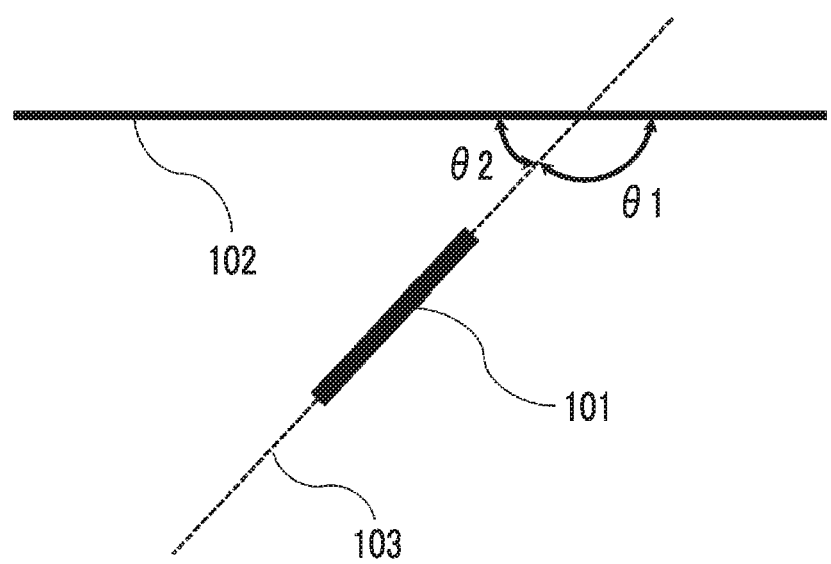
FIG. 2 is an explanatory diagram of another angle θ regarding a cos θ.

FIG. 1 and FIG. 2 are explanatory diagrams of the angle θ. In FIG. 1 and FIG. 2, a reference numeral 101 indicates a line segment (length in the long axis direction) drawn by connecting end portions which are most separated from each other, a reference numeral 102 indicates the reference line, and a reference numeral 103 indicates an extended line of the line segment (reference numeral 101). In this case, as the angle formed by the reference line 102 and the extended line 103, θ1 and θ2 are exemplified as shown in FIG. 1 and FIG. 2. Here, a smaller angle is used from the θ1 and θ2, and this is set as the angle θ. Accordingly, in the aspect shown in FIG. 1, the θ1 is set as the angle θ, and in the aspect shown in FIG. 2, θ2 is set as the angle θ. A case where θ1=θ2 is a case where the angle θ=90°. The cos θ based on the unit circle becomes 1.00, in a case where the θ=0°, and becomes 0, in a case where the θ=90°.

The magnetic tape includes the abrasive and the ferromagnetic hexagonal ferrite powder in the magnetic layer, and cos θ is 0.85 to 1.00. The inventor has thought that hexagonal ferrite particles satisfying the aspect ratio and the length in the long axis direction among the hexagonal ferrite particles configuring the ferromagnetic hexagonal ferrite powder included in the magnetic layer can support the abrasive. The inventor has thought that this point contributes the exhibiting of a function of removing head attached materials, even the abrasive is present in the magnetic layer of the magnetic tape in a fine state. This point will be further described below.

From the studies of the inventor, it was clear that electromagnetic conversion characteristics are deteriorated, in a case where the magnetic tape repeatedly runs in a drive in a low temperature and high humidity environment, while allowing the surface of the magnetic layer of the magnetic tape having the total thickness of the non-magnetic layer and the magnetic layer equal to or smaller than 0.60 μm and the head to slide on each other.

Meanwhile, the abrasive can impart a function of removing head attached material (abrasion properties) to the surface of the magnetic layer. When the surface of the magnetic layer exhibits abrasion properties, it is possible to remove the head attached material generated due to the chipping of a part of the surface of the magnetic layer caused by the sliding between the surface of the magnetic layer and the head and attached to the head. However, the inventor has surmised that, in a case where the surface of the magnetic layer does not sufficiently exhibit the abrasion properties, the head and the surface of the magnetic layer slide on each other in a state where the attached material is attached to the head, the head attached material causes spacing loss, and as a result, electromagnetic conversion characteristics are deteriorated. The inventor has thought that the deterioration of abrasion properties of the surface of the magnetic layer occurs due to the abrasive present in the vicinity of the surface of the magnetic layer, which is pressed into the magnetic layer at the time of sliding on the head.

With respect to this, the inventor has considered that the pressing of the abrasive present in the vicinity of the surface of the magnetic layer into the magnetic layer due to the sliding on the head can be prevented by supporting the abrasive by the hexagonal ferrite particles satisfying the aspect ratio and the length in the long axis direction. Thus, the inventor has surmised that it is possible to prevent a deterioration of abrasion properties of the surface of the magnetic layer and it is possible to prevent occurrence of a deterioration of electromagnetic conversion characteristics due to the effect of attached material attached to the head.

A squareness ratio is known as an index of a presence state (orientation state) of the ferromagnetic hexagonal ferrite powder of the magnetic layer. However, according to the studies of the inventor, an excellent correlation was not observed between the squareness ratio and a degree of prevention of the deterioration of electromagnetic conversion characteristics. The squareness ratio is a value indicating a ratio of residual magnetization with respect to saturated magnetization, and is measured using all of the particles as targets, regardless of the shapes and size of the particles included in the ferromagnetic hexagonal ferrite powder. With respect to this, the cos θ is a value measured by selecting the hexagonal ferrite particles having the aspect ratio and the length in the long axis direction in the ranges described above. The inventor has thought that, due to such a difference between the cos θ and the squareness ratio, an excellent correlation between the squareness ratio and a degree of prevention of the deterioration of electromagnetic conversion characteristics is not observed, but the deterioration of electromagnetic conversion characteristics may be prevented by controlling the cos θ.

However, this is merely a surmise, and the invention is not limited thereto.

Adjustment Method

The magnetic tape can be manufactured through a step of applying a magnetic layer forming composition onto the non-magnetic layer. As an adjustment method of the cos θ, a method of controlling a dispersion state of the ferromagnetic hexagonal ferrite powder of the magnetic layer forming composition is used. Regarding this viewpoint, the inventor has thought that, as dispersibility of the ferromagnetic hexagonal ferrite powder in the magnetic layer forming composition is increased, the hexagonal ferrite particles having the aspect ratio and the length in the long axis direction in the ranges described above in the magnetic layer formed by using this magnetic layer forming composition are easily oriented in a state closer to parallel to the surface of the magnetic layer. As means for increasing dispersibility, any one or both of the following methods (1) and (2) are used.

(1) Adjustment of Dispersion Conditions (2) Use of Dispersing Agent for Improving Dispersibility of Ferromagnetic Hexagonal Ferrite Powder In addition, as means for increasing dispersibility, a method of separately dispersing the ferromagnetic hexagonal ferrite powder and the abrasive is also used. The separate dispersing is as described above. The inventor has surmised that the separate dispersing contributes to an increase in dispersibility of the abrasive and also contributes to an increase in dispersibility of the ferromagnetic hexagonal ferrite powder. In addition, it is also preferable that any one or both of the methods (1) and (2) is combined with the separate dispersion described above. In this case, by controlling the dispersion state of the ferromagnetic hexagonal ferrite powder of the magnetic solution, it is possible to control the dispersion state of the ferromagnetic hexagonal ferrite powder of the magnetic layer forming composition obtained through the step of mixing the magnetic solution with the abrasive liquid.

Hereinafter, specific aspects of the methods (1) and (2) will be described.

(1) Adjustment of Dispersion Conditions

A dispersing process of the magnetic layer forming composition, preferably the magnetic solution can be performed by adjusting the dispersion conditions thereof by using a well-known dispersing method. The dispersion conditions of the dispersing process, for example, include the types of a dispersion device, the types of dispersion media used in the dispersion device, and a retention time in the dispersion device (hereinafter, also referred to as a "dispersion retention time").

As the dispersion device, various well-known dispersion devices using a shear force such as a ball mill, a sand mill, or a homomixer. A dispersing process having two or more stages may be performed by connecting two or more dispersion devices to each other, or different dispersion devices may be used in combination. A circumferential speed of a tip of the dispersion device is preferably 5 to 20 msec and more preferably 7 to 15 msec.

As the dispersion medium, ceramic beads or glass beads are used, and zirconia beads are preferable. Two or more types of beads may be used in combination. A particle diameter of the dispersion medium is, for example, 0.03 to 1 mm and is preferably 0.05 to 0.5 mm. In a case of performing the dispersing process having two or more stages by connecting the dispersion devices as described above, the dispersion medium having different particle diameters may be used in each stage. It is preferable that the dispersion medium having a smaller particle diameter is used, as the stages are passed. A filling percentage of the dispersion medium can be, for example, 30% to 80% and preferably 50% to 80% based on the volume.

The dispersion retention time may be suitably set b considering the circumferential speed of the tip of the dispersion device and the filling percentage of the dispersion medium, and can be, for example, 15 to 45 hours and preferably 20 to 40 hours. In a case of performing the dispersing process having two or more stages by connecting the dispersion devices as described above, the total dispersion retention time of each stage is preferably in the range described above. By performing the dispersing process described above, it is possible to increase the dispersibility of the ferromagnetic hexagonal ferrite powder and to adjust the cos θ to be 0.85 to 1.00.

(2) Use of Dispersing Agent for Improving Dispersibility of Ferromagnetic Hexagonal Ferrite Powder It is possible to increase the dispersibility of the ferromagnetic hexagonal ferrite powder by using a dispersing agent for improving dispersibility of the ferromagnetic hexagonal ferrite powder at the time of preparing the magnetic layer forming composition, preferably at the time of preparing the magnetic solution. Here, the dispersing agent for improving dispersibility of the ferromagnetic hexagonal ferrite is a component which can increase the dispersibility of the ferromagnetic hexagonal ferrite powder of the magnetic layer forming composition and/or the magnetic solution, compared to a state where the agent is not present. It is also possible to control the dispersion state of the ferromagnetic hexagonal ferrite powder by changing the type and the amount of the dispersing agent included in the magnetic layer forming composition and/or the magnetic solution. As the dispersing agent for improving dispersibility of the ferromagnetic hexagonal ferrite, a dispersing agent which prevents aggregation of the hexagonal ferrite particles configuring the ferromagnetic hexagonal ferrite powder and imparts suitable plasticity to the magnetic layer is also preferably used, from a viewpoint of increasing durability of the magnetic layer.

As an aspect of the dispersing agent preferable for improving the dispersibility of the ferromagnetic hexagonal ferrite powder, a polyester chain-containing compound can be used. The polyester chain-containing compound is preferable from a viewpoint of imparting suitable plasticity to the magnetic layer. Here, the polyester chain is shown as E in General Formula A which will be described later. Specific aspects thereof include a polyester chain contained in General Formula 1, a polyester chain represented by Formula 2-A, and a polyester chain represented by Formula 2-B which will be described later. The inventor has surmised that, by mixing the polyester chain-containing compound with the magnetic layer forming composition and/or the magnetic solution together with the ferromagnetic hexagonal ferrite powder, it is possible to prevent aggregation of particles, due to the polyester chain interposed between the hexagonal ferrite particles. However, this is merely the surmise, and the invention is not limited thereto. A weight-average molecular weight of the polyester chain-containing compound is preferably equal to or greater than 1,000, from a viewpoint of improving the dispersibility of the ferromagnetic hexagonal ferrite powder. In addition, the weight-average molecular weight of the polyester chain-containing compound is preferably equal to or smaller than 80,000. The inventor has thought that the polyester chain-containing compound having a weight-average molecular weight equal to or smaller than 80,000 can increase the durability of the magnetic layer by exhibiting an operation of a plasticizer. The weight-average molecular weight of the invention and the specification is a value obtained by performing reference polystyrene conversion of a value measured by gel permeation chromatography (GPC). Specific examples of the measurement conditions will be described later. In addition, the preferred range of the weight-average molecular weight will be also described later.

As a preferred aspect of the polyester chain-containing compound, a compound having a partial structure represented by General Formula A is used. In the invention and the specification, unless otherwise noted, a group disclosed may include a substituent or may be non-substituted. In a case where a given group includes a substituent, examples of the substituent include an alkyl group (for example, alkyl group having 1 to 6 carbon atoms), a hydroxyl group, an alkoxy group (for example, alkoxy group having 1 to 6 carbon atoms), a halogen atom (for example, a fluorine atom, a chlorine atom, or a bromine atom), a cyano group, an amino group, a nitro group, an acyl group, carboxyl (salt) group. In addition, the "number of carbon atoms" of the group including a substituent means the number of carbon atoms of a portion not including a substituent.

General Formula A

In General Formula A, Q represents —O—, —CO—, —S—, —$NR^a$—, or a single bond, T and $R^a$ each independently represent a hydrogen atom or a monovalent substituent, E represents —(O-$L^A$-CO)a- or —(CO-$L^A$-O)a-, $L^A$ represents a divalent linking group, a represents an integer equal to or greater than 2, b represents an integer equal to or greater than 1, and * represents a bonding site with another partial structure configuring the polyester chain-containing compound.

In General Formula A, the number of $L^A$ included is a value of a×b. In addition, the numbers of T and Q included are respectively the value of b. In a case where a plurality of $L^A$ are included in General Formula A, the plurality of $L^A$ may be the same as each other or different from each other. The same applies to T and Q.

It is considered that the compound described above can prevent aggregation of hexagonal ferrite particles due to a steric hindrance caused by the partial structure, in the magnetic solution and the magnetic layer forming composition.

As a preferred aspect of the polyester chain-containing compound, a compound including a group which can be adsorbed to the surface of the hexagonal ferrite particles or the partial structure (hereinafter, referred to as an "adsorption part") together with the polyester chain in a molecule is used. It is preferable that the polyester chain is included in the partial structure represented by General Formula A. In addition, it is more preferable that the partial structure and the adsorption part represented by General Formula A form a bond through * in General Formula A.

In one aspect, the adsorption part can be a functional group (polar group) having polarity to be an adsorption point to the surface of the hexagonal ferrite particles. As a specific example, at least one polar group selected from a carboxyl group (—COOH) and a salt thereof (—$COO^-M^+$), a sulfonic acid group (—$SO_3H$) and a salt thereof (—$SO_3^-M^+$), a sulfuric acid group (—$OSO_3H$) and a salt thereof (—$OSO_3^-M^+$), a phosphoric acid group (—P=$O(OH)_2$) and a salt thereof (—P=$O(O^-M^+)_2$), an amino group (—$NR_2$), —$N^+R_3$, an epoxy group, a thiol group (—SH), and a cyano group (—CN) (here, $M^+$ represents a cation such as an alkali metal ion and R represents a hydrogen atom or a hydrocarbon group) can be used. In addition, the "carboxyl (salt) group" means one or both of a carboxyl group and a salt thereof (carboxylic salt). The carboxylic salt is a state of a salt of the carboxyl group (—COOH) as described above.

As one aspect of the adsorption part, a polyalkyleneimine chain can also be used.

The types of the bond formed by the partial structure and the adsorption part represented by General Formula A are not particularly limited. Such a bond is preferably selected from the group consisting of a covalent bond, a coordinate bond, and an ion bond, and a bond of different types may be included in the same molecule. It is considered that by efficiently performing the adsorption with respect to the hexagonal ferrite particles through the adsorption part, it is possible to further increase an aggregation prevention effect of the hexagonal ferrite particles based on the steric hindrance caused by the partial structure represented by General Formula A.

In one aspect, the polyester chain-containing compound can include at least one polyalkyleneimine chain. The polyester chain-containing compound can preferably include a polyester chain in the partial structure represented by General Formula A. As a preferred example of the polyester chain-containing compound, a polyalkyleneimine derivative including a polyester chain selected from the group consisting of a polyester chain represented by Formula 2-A and a polyester chain represented by Formula 2-B as General Formula A is used. These examples will be described later in detail.

Formula 2-A

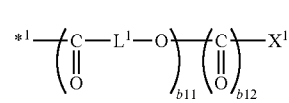

Formula 2-B

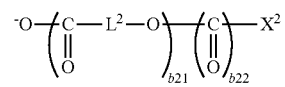

$L^1$ in Formula 2-A and $L^2$ in Formula 2-B each independently represent a divalent linking group, b11 in Formula 2-A and b21 in Formula 2-B each independently represent an integer equal to or greater than 2, b12 in Formula 2-A and b22 in Formula 2-B each independently represent 0 or 1, and $X^1$ in Formula 2-A and $X^2$ in Formula 2-B each independently represent a hydrogen atom or a monovalent substituent.

In General Formula A, Q represents —O—, —CO—, —S—, —$NR^a$—, or a single bond, and is preferably a portion represented by X in General Formula 1 which will be described later, (—CO—)b12 in Formula 2-A or (—CO—)b22 in Formula 2-B.

In General Formula A, T and $R^a$ each independently represent a hydrogen atom or a monovalent substituent and is preferably a portion represented by R in General Formula 1 which will be described later, $X^1$ in Formula 2-A or $X^2$ in Formula 2-B.

In General Formula A, E represents —(O-$L^A$-CO)a- or —(CO-$L^A$-O)a-, $L^A$ represents a divalent linking group, and a represents an integer equal to or greater than 2.

As a divalent linking group represented by $L^A$, L in General Formula 1 which will be described later, $L^1$ in Formula 2-A or $L^2$ in Formula 2-B is preferably used.

In one aspect, the polyester chain-containing compound can include at least one group selected from the group consisting of a carboxyl group and a carboxylic salt. Such a polyester chain-containing compound can preferably include a polyester chain in the partial structure represented by General Formula A. As a preferred example of the polyester chain-containing compound, a compound represented by General Formula 1 is used.

Compound Represented by General Formula 1

General Formula 1 is as described below.

General Formula 1

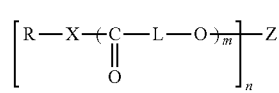

(In General Formula 1, X represents —O—, —S—, or —NR$^1$—, R and R$^1$ each independently represent a hydrogen atom or a monovalent substituent, L represents a divalent linking group, Z represents a n-valent partial structure including at least one group (carboxyl (salt) group) selected from the group consisting of a carboxyl group and a carboxylic salt, m represents an integer equal to or greater than 2, and n represents an integer equal to or greater than 1.)

In General Formula 1, the number of L included is a value of m×n. In addition, the numbers of R and X included are respectively the value of n. In a case where a plurality of L are included in General Formula 1, the plurality of L may be the same as each other or different from each other. The same applies to R and X.

The compound represented by General Formula 1 has a structure (polyester chain) represented by —((C═O)-L-O)m-, and a carboxyl (salt) group is included in the Z part as the adsorption part. It is considered that, when the compound represented by General Formula 1 is effectively adsorbed to the hexagonal ferrite particles by setting the carboxyl (salt) group included in the Z part as the adsorption part to the surface of the hexagonal ferrite particles, it is possible to prevent aggregation of the hexagonal ferrite particles caused by steric hindrance caused by the polyester chain.

In General Formula 1, X represents —O—, —S—, or —NR$^1$—, and R$^1$ represents a hydrogen atom or a monovalent substituent. As the monovalent substituent represented by R$^1$, an alkyl group, a hydroxyl group, an alkoxy group, a halogen atom, a cyano group, an amino group, a nitro group, an acyl group, and a carboxyl (salt) group which is the substituent described above can be used, an alkyl group is preferably used, an alkyl group having 1 to 6 carbon atoms is more preferably used, and a methyl group or an ethyl group is even more preferably used. R$^1$ is still more preferably a hydrogen atom. X preferably represents —O—.

R represents a hydrogen atom or a monovalent substituent. R preferably represents a monovalent substituent. As the monovalent substituent represented by R, a monovalent group such as an alkyl group, an aryl group, a heteroaryl group, an alicyclic group, or a nonaromatic heterocyclic group, and a structure in which a divalent linking group is bonded to the monovalent group (that is, R has a structure in which a divalent linking group is bonded to the monovalent group and is a monovalent substituent bonding with X through the divalent linking group) can be used, for example. As the divalent linking group, a divalent linking group configured of a combination of one or two or more selected from the group consisting of —C(═O)—O—, —O—, —C(═O)—NR$^{10}$—(R$^{10}$ represents a hydrogen atom or an alkyl group having 1 to 4 carbon atoms), —O—C(═O)—NH—, a phenylene group, an alkylene group having 1 to 30 carbon atoms, and an alkenylene group having 2 to 30 carbon atoms can be used, for example. As a specific example of the monovalent substituent represented by R, the following structures are used, for example. In the following structures, * represent a bonding site with X. However, R is not limited to the following specific example.

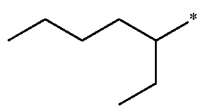

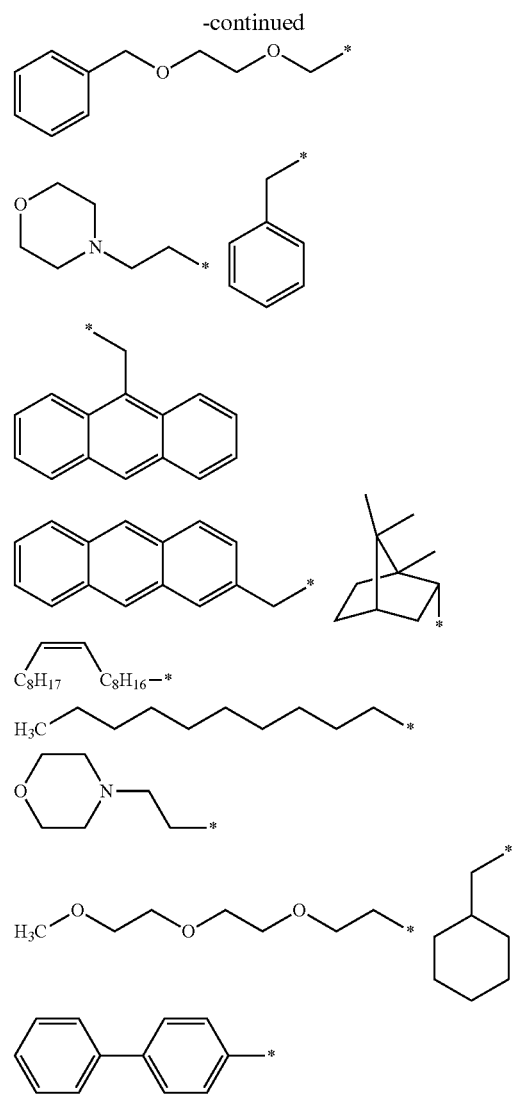

In General Formula 1, L represents a divalent linking group. As the divalent linking group, a divalent linking group which is configured of a combination of one or two or more selected from the group consisting of an alkylene group which may have a linear, branched, or ring structure, an alkenylene group which may have a linear, branched, or ring structure, —C(═O)—, —O—, and an arylene group, and which may include a substituent in the divalent linking group or a halogen atom as an anion can be used. More specifically, a divalent linking group configured of a combination of one or two or more selected from an alkylene group having 1 to 12 carbon atoms which may have a linear, branched, or ring structure, an alkenylene group having 1 to 6 carbon atoms which may have a linear, branched, or ring structure, —C(═O)—, —O—, and a phenylene group can be used. The divalent linking group is preferably a divalent linking group having 1 to 10 carbon atoms, 0 to 10 oxygen atoms, 0 to 10 halogen atoms, and 1 to 30 hydrogen atoms. As a specific example, an alkylene group and the following structure are used. In the following structure, * represents a bonding site with the other structure in General Formula 1. However, the divalent linking group is not limited to the following specific example.

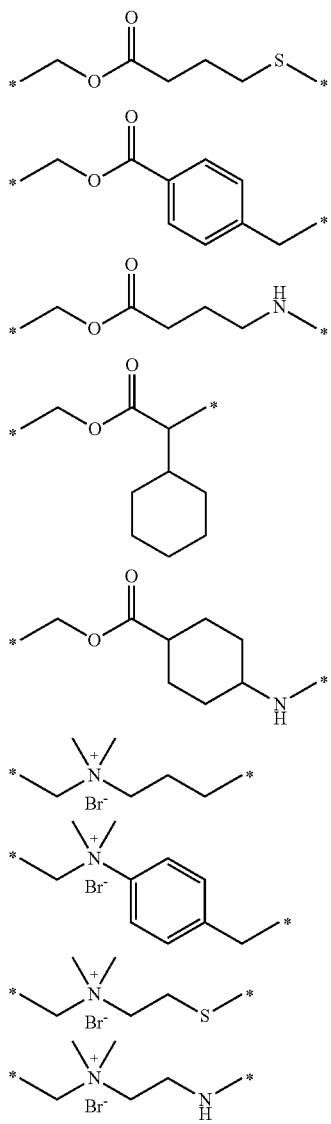

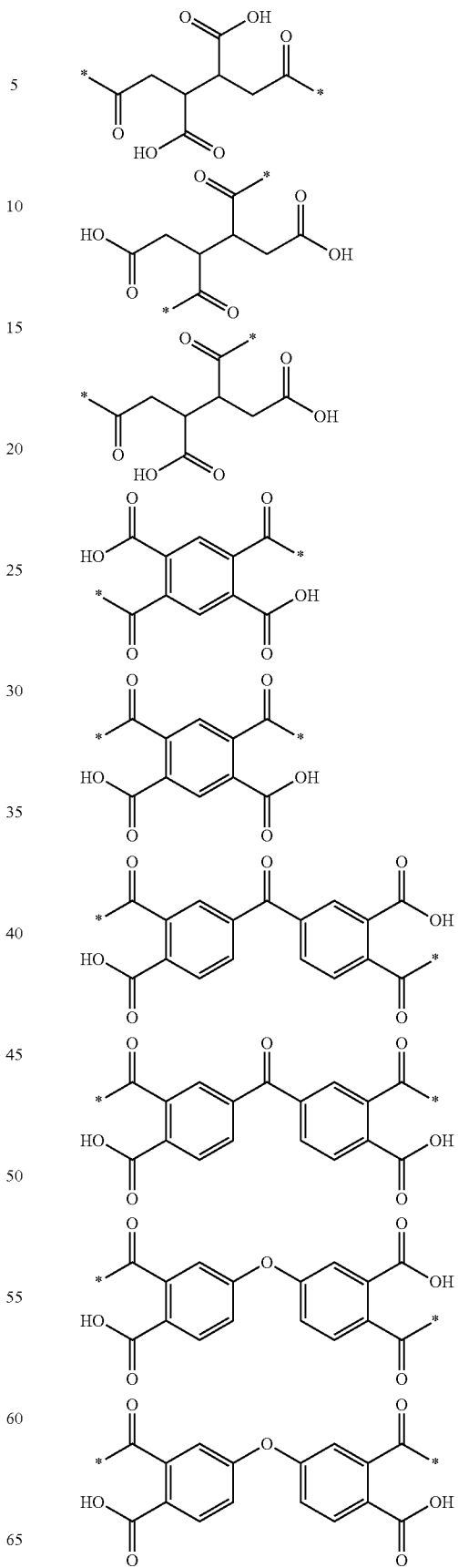

L is preferably an alkylene group, more preferably an alkylene group having 1 to 12 carbon atoms, even more preferably an alkylene group having 1 to 5 carbon atoms, and still more preferably a non-substituted alkylene group having 1 to 5 carbon atoms.

Z represents an n-valent partial structure including at least one group (carboxyl (salt) group) selected from the group consisting of a carboxyl group and a carboxylic salt.

The number of the carboxyl (salt) group included in Z is at least 1, preferably equal to or greater than 2, and more preferably 2 to 4, for one Z.

Z can have a structure of one or more selected from the group consisting of a linear structure, a branched structure, and a cyclic structure. From a viewpoint of easiness of synthesis, Z is preferably a reactive residue of a carboxylic acid anhydride. For example, as a specific example, the following structures are used. In the following structures, * represents a bonding site with the other structure in General Formula 1. However, Z is not limited to the following specific example.

-continued

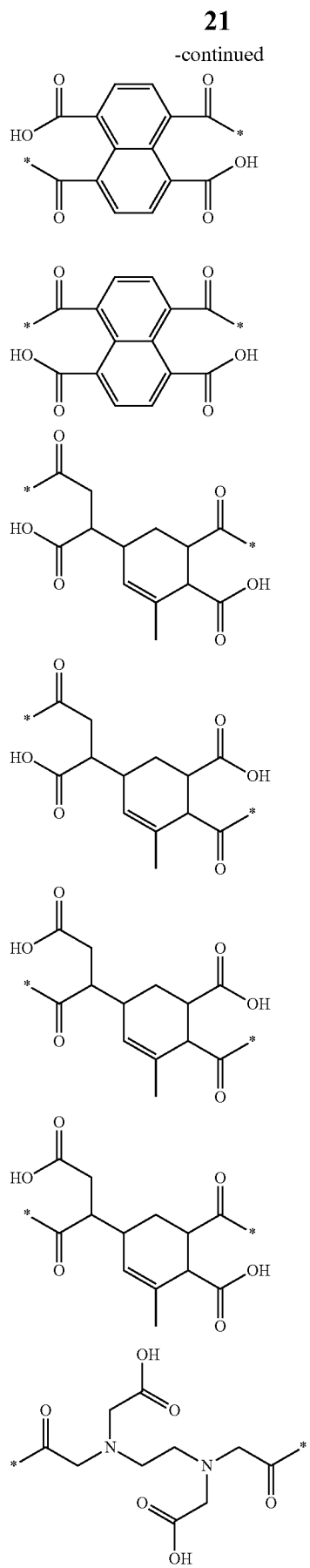

-continued

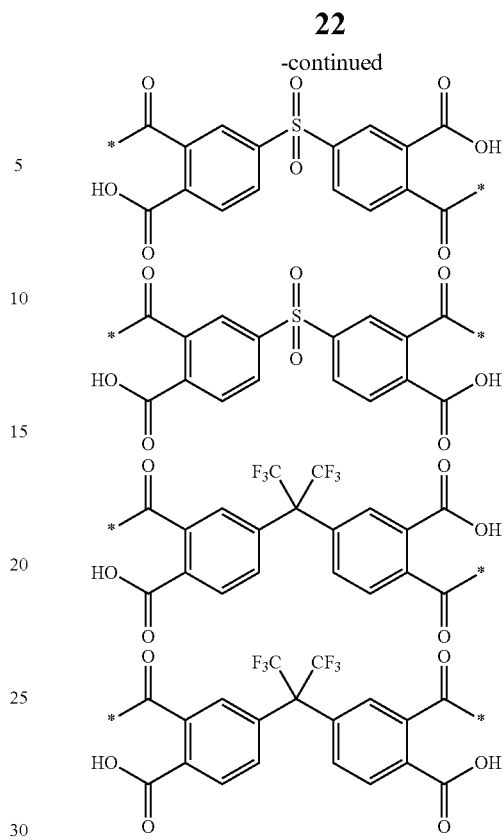

The carboxylic acid anhydride is a compound having a partial structure represented by —(C=O)—O—(C=O)—. In the carboxylic acid anhydride, the partial structure becomes a reactive site, and an oxygen atom and Z of —((C=O)-L-O)m- in General Formula 1 are bonded to each other through a carbonyl bond (—(C=O)—), and a carboxyl (salt) group is obtained. The partial structure generated as described above is a reactive residue of a carboxylic acid anhydride. By synthesizing the compound represented by General Formula 1 by using a compound having one partial structure —(C=O)—O—(C=O)—, as the carboxylic acid anhydride, it is possible to obtain a compound represented by General Formula 1 including a monovalent reactive residue of the carboxylic acid anhydride, and it is possible to obtain a compound represented by General Formula 1 including a divalent reactive residue of the carboxylic acid anhydride, by using the compound having two partial structures described above. The same applies to the compound represented by General Formula 1 including a tri- or higher valent reactive residue of the carboxylic acid anhydride. As described above, n is an integer equal to or greater than 1, is, for example, an integer of 1 to 4, and is preferably an integer of 2 to 4.

It is possible to obtain a compound represented by General Formula 1 in a case of n=2, by using the tetracarboxylic acid anhydride, for example, as the carboxylic acid anhydride. The tetracarboxylic acid anhydride is a carboxylic acid anhydride having two partial structures described above in one molecule, by dehydration synthesis of two carboxyl groups, in the compound including four carboxyl groups in one molecule. In General Formula 1, the compound in which Z represents a reactive residue of the tetracarboxylic acid anhydride is preferable, from viewpoints of further improving dispersibility of ferromagnetic hexagonal ferrite powder and durability of the magnetic layer. Examples of the tetracarboxylic acid anhydride include various tetracarboxylic acid anhydrides such as aliphatic tetracarboxylic acid anhydride, aromatic tetracarboxylic acid anhydride, and polycyclic tetracarboxylic acid anhydride.

As the aliphatic tetracarboxylic acid anhydride, for example, various aliphatic tetracarboxylic acid anhydrides disclosed in a paragraph 0040 of JP2016-071926A can be used. As the aromatic tetracarboxylic acid anhydride, for example, various aromatic tetracarboxylic acid anhydrides disclosed in a paragraph 0041 of JP2016-071926A can be used. As the polycyclic tetracarboxylic acid anhydride, various polycyclic tetracarboxylic acid anhydrides disclosed in a paragraph 0042 of JP2016-071926A can be used.

In General Formula 1, m represents an integer equal to or greater than 2. As described above, it is thought that the structure (polyester chain) represented by —((C=O)-L-O) m- of the compound represented by General Formula 1 contributes to the improvement of dispersibility and the durability. From these viewpoints, m is preferably an integer of 5 to 200, more preferably an integer of 5 to 100, and even more preferably an integer of 5 to 60.

Weight-Average Molecular Weight

The weight-average molecular weight of the compound represented by General Formula 1 is preferably 1,000 to 80,000 as described above and more preferably 1,000 to 20,000. The weight-average molecular weight of the compound represented by General Formula 1 is even more preferably smaller than 20,000, further more preferably equal to or smaller than 12,000, and sill more preferably equal to or smaller than 10,000. In addition, the weight-average molecular weight of the compound represented by General Formula 1 is preferably equal to or greater than 1,500 and more preferably equal to or greater than 2,000. Regarding the compound represented by General Formula 1, the weight-average molecular weight shown in Examples which will be described later is a value obtained by performing reference polystyrene conversion of a value measured by GPC under the following measurement conditions. In addition, the weight-average molecular weight of a mixture of two or more kinds of structural isomers is a weight-average molecular weight of two or more kinds of structural isomers included in this mixture.

GPC device: HLC-8220 (manufactured by Tosoh Corporation)

Guard column: TSK guard column Super HZM-H

Column: TSK gel Super HZ 2000, TSK gel Super HZ 4000, TSK gel Super HZ-M (manufactured by Tosoh Corporation, 4.6 mm (inner diameter)×15.0 cm, three types of columns are connected in series)

Eluent: Tetrahydrofuran (THF), containing a stabilizer (2,6-di-t-butyl-4-methylphenol)

Flow rate of eluent: 0.35 mL/min

Column temperature: 40° C.

Inlet temperature: 40° C.

Refractive index (RI) measurement temperature: 40° C.

Sample concentration: 0.3 mass %

Sample introduction amount: 10 μL

Synthesis Method

The compound represented by General Formula 1 described above can be synthesized by a well-known method. As an example of the synthesis method, a method of allowing a reaction such as a ring-opening addition reaction between the carboxylic acid anhydride and a compound represented by General Formula 2 can be used, for example. In General Formula 2, R, X, L, and m are the same as those in General Formula 1. A represents a hydrogen atom, an alkali metal atom, or quaternary ammonium base and is preferably a hydrogen atom.

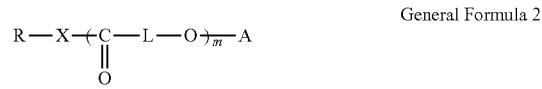

General Formula 2

In a case of using a butanetetracarboxylic acid anhydride, for example, the reaction between the carboxylic acid anhydride and a compound represented by General Formula 2 is performed by mixing the butanetetracarboxylic acid anhydride at a percentage of 0.4 to 0.5 moles with respect to 1 equivalent of a hydroxyl group, and heating and stirring the mixture approximately for 3 to 12 hours, under the absence of solvent, if necessary, under the presence of an organic solvent having a boiling point equal to or higher than 50° C., further, a reaction catalyst such as tertiary amine or inorganic base. Even in a case of using other carboxylic acid anhydride, a reaction between the carboxylic acid anhydride and the compound represented by General Formula 2 can be performed under the reaction conditions described above or under well-known reaction conditions.

After the reaction, post-step such as purification may be performed, if necessary.

In addition, the compound represented by General Formula 2 can also be obtained by using a commercially available product or by a well-known polyester synthesis method. For example, as the polyester synthesis method, ring-opening polymerization of lactone can be used. As the ring-opening polymerization of lactone, descriptions disclosed in paragraphs 0050 and 0051 of JP2016-071926A can be referred to. However, the compound represented by General Formula 2 is not limited to a compound obtained by the ring-opening polymerization of lactone, and can also be a compound obtained by a well-known polyester synthesis method, for example, polycondensation of polyvalent carboxylic acid and polyhydric alcohol or polycondensation of hydroxycarboxylic acid.

The synthesis method described above is merely an example and there is no limitation regarding the synthesis method of the compound represented by General Formula 1. Any well-known synthesis method can be used without limitation, as long as it is a method capable of synthesizing the compound represented by General Formula 1. The reaction product after the synthesis can be used for forming the magnetic layer, as it is, or by purifying the reaction product by a well-known method, if necessary. The compound represented by General Formula 1 may be used alone or in combination of two or more kinds having different structures, in order to form the magnetic layer. In addition, the compound represented by General Formula 1 may be used as a mixture of two or more kinds of structural isomers. For example, in a case of obtaining two or more kinds of structural isomers by the synthesis reaction of the compound represented by General Formula 1, the mixture can also be used for forming the magnetic layer.

As the compound represented by General Formula 1, various compounds included in reaction products shown in synthesis examples in Examples disclosed in JP2016-071926 can be used. For example, as a specific example thereof, compounds shown in Table 1 can be used. A weight-average molecular weight shown in Table 1 is a weight-average molecular weight of the compound represented by structural formula shown in Table 1 or a weight-average molecular weight of the compound represented by structural formula shown in Table 1 and a mixture of structural isomers thereof.

TABLE 1

| Types | Structural Formula | Weight-average molecular weight |
|---|---|---|
| Compound 1 | | 9200 |
| Compound 2 | | 6300 |
| Compound 3 | | 5300 |
| Compound 4 | | 8000 |

TABLE 1-continued

| Types | Structural Formula | Weight-average molecular weight |
|---|---|---|
| Compound 5 | | 8700 |
| Compound 6 | | 8600 |
| Compound 7 | | 6200 |
| Compound 8 | | 8000 |

As an aspect of a preferred example of the compound having the partial structure and the adsorption part represented by General Formula A, a polyalkyleneimine derivative including a polyester chain represented by Formula 2-A or 2-B as General Formula A is used. Hereinafter, the polyalkyleneimine derivative will be described.

Polyalkyleneimine Derivative

The polyalkyleneimine derivative is a compound including at least one polyester chain selected from the group consisting of a polyester chain represented by Formula 2-A and a polyester chain represented by Formula 2-B, and a polyalkyleneimine chain having a number average molecular weight of 300 to 3,000. A percentage of the polyalkyleneimine chain occupying the compound is preferably smaller than 5.0 mass %.

The polyalkyleneimine derivative includes a polyalkyleneimine chain which is an aspect of the adsorption part described above. In addition, it is thought that the steric hindrance caused by the polyester chain included in the polyalkyleneimine derivative is caused in the magnetic layer forming composition and/or the magnetic solution, and accordingly, it is possible to prevent aggregation of the hexagonal ferrite particles.

Hereinafter, the polyester chain and the polyalkyleneimine chain included in the polyalkyleneimine derivative will be described.

Polyester Chain

Structure of Polyester Chain

The polyalkyleneimine derivative includes at least one polyester chain selected from the group consisting of a polyester chain represented by Formula 2-A and a polyester chain represented by Formula 2-B, together with a polyalkyleneimine chain which will be described later. In one aspect, the polyester chain is bonded to an alkyleneimine chain represented by Formula A which will be described later by a nitrogen atom N included in Formula A and a carbonyl bond —(C=O)— at *$^1$ of Formula A, and —N—(=O)— can be formed. In addition, in another aspect, an alkyleneimine chain represented by Formula B which will be described later and the polyester chain can form a salt crosslinking group by a nitrogen cation N$^+$ in Formula B and an anionic group including a polyester chain. As the salt crosslinking group, a component formed by an oxygen anion O$^-$ included in the polyester chain and N$^+$ in Formula B can be used.

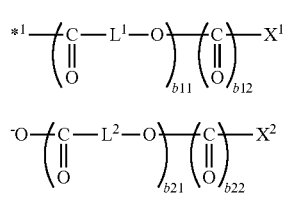

Formula 2-A

Formula 2-B

As the polyester chain bonded to the alkyleneimine chain represented by Formula A by a nitrogen atom N included in Formula A and a carbonyl bond —(C=O)—, the polyester chain represented by Formula 2-A can be used. The polyester chain represented by Formula 2-A can be bonded to the alkyleneimine chain represented by Formula A by forming —N—(=O)— by a nitrogen atom included in the alkyleneimine chain and a carbonyl group —(C=O)— included in the polyester chain at the bonding site represented by *$^1$.

In addition, as the polyester chain bonded to the alkyleneimine chain represented by Formula B by forming a salt crosslinking group by N$^+$ in Formula B and an anionic group including the polyester chain, the polyester chain represented by Formula 2-B can be used. The polyester chain represented by Formula 2-B can form N$^+$ in Formula B and a salt crosslinking group by an oxygen anion O$^-$.

L$^1$ in Formula 2-A and L$^2$ in Formula 2-B each independently represent a divalent linking group. As the divalent linking group, an alkylene group having 3 to 30 carbon atoms can be preferably used. In a case where the alkylene group includes a substituent, the number of carbon atoms of the alkylene group is the number of carbon atoms of a part (main chain part) excluding the substituent, as described above.

b11 in Formula 2-A and b21 Formula 2-B each independently represent an integer equal to or greater than 2, for example, an integer equal to or smaller than 200. The number of lactone repeating units shown in Table 3 which will be described later corresponds to b11 in Formula 2-A or b21 Formula 2-B.

b12 in Formula 2-A and b22 Formula 2-B each independently represent 0 or 1.

X$^1$ in Formula 2-A and X$^2$ Formula 2-B each independently represent a hydrogen atom or a monovalent substituent. As the monovalent substituent, a monovalent substituent selected from the group consisting of an alkyl group, a haloalkyl group (for example, fluoroalkyl group), an alkoxy group, a polyalkyleneoxyalkyl group, and an aryl group can be used.

The alkyl group may include a substituent or may be non-substituted. As the alkyl group including a substituent, an alkyl group (hydroxyalkyl group) substituted with a hydroxyl group, and an alkyl group substituted with one or more halogen atoms are preferable. In addition, an alkyl group (haloalkyl group) in which all of hydrogen atoms bonded to carbon atoms are substituted with halogen atoms is also preferable. As the halogen atom, a fluorine atom, a chlorine atom, or a bromine atom can be used. The alkyl group is more preferably an alkyl group having 1 to 30 carbon atoms, and even more preferably an alkyl group having 1 to 10 carbon atoms. The alkyl group may have any of a linear, branched, and cyclic structure. The same applies to the haloalkyl group.

Specific examples of substituted or non-substituted alkyl group or haloalkyl group include a methyl group, an ethyl group, a propyl group, a butyl group, a pentyl group, a hexyl group, a heptyl group, an octyl group, a nonyl group, a decyl group, a undecyl group, a dodecyl group, a tridecyl group, a pentadecyl group, a hexadecyl group, a heptadecyl group, an octadecyl group, an eicosyl group, an isopropyl group, an isobutyl group, an isopentyl group, a 2-ethylhexyl group, a tert-octyl group, a 2-hexyldecyl group, a cyclohexyl group, a cyclopentyl group, a cyclohexylmethyl group, an octylcyclohexyl group, a 2-norbornyl group, a 2,2,4-trimethylpentyl group, an acetylmethyl group, an acetylethyl group, a hydroxymethyl group, a hydroxyethyl group, a hydroxypropyl group, a hydroxybutyl group, a hydroxypentyl group, a hydroxyhexyl group, a hydroxyheptyl group, a hydroxyoctyl group, a hydroxynonyl group, a hydroxydecyl group, a chloromethyl group, a dichloromethyl group, a trichloromethyl group, a bromomethyl group, a 1,1,1,3,3,3-hexafluoroisopropyl group, a heptafluoropropyl group, a pentadecafluoroheptyl group, a nonadecafluorononyl group, a hydroxyundecyl group, a hydroxydodecyl group, a hydroxypentadecyl group, a hydroxyheptadecyl group, and a hydroxyoctadecyl group.

Examples of the alkoxy group include a methoxy group, an ethoxy group, a propyloxy group, a hexyloxy group, a methoxyethoxy group, a methoxyethoxyethoxy group, and a methoxyethoxyethoxymethyl group.

The polyalkyleneoxyalkyl group is a monovalent substituent represented by $R^{10}(OR^{11})n1(O)m1-$. $R^{10}$ represents an alkyl group, $R^{11}$ represents an alkylene group, n1 represents an integer equal to or greater than 2, and m1 represents 0 or 1.

The alkyl group represented by $R^{10}$ is as described regarding the alkyl group represented by $X^1$ or $X^2$. For the specific description of the alkylene group represented by $R^{11}$, the description regarding the alkyl group represented by $X^1$ or $X^2$ can be applied by replacing the alkyl group with an alkylene group obtained by removing one hydrogen atom from the alkylene group (for example, by replacing the methyl group with a methylene group). n1 is an integer equal to or greater than 2, for example, an integer equal to or smaller than 10, and preferably equal to or smaller than 5.

The aryl group may include a substituent or may be annelated, and more preferably an aryl group having 6 to 24 carbon atoms, and examples thereof include a phenyl group, a 4-methylphenyl group, 4-phenylbenzoic acid, a 3-cyanophenyl group, a 2-chlorophenyl group, and a 2-naphthyl group.

The polyester chain represented by Formula 2-A and the polyester chain represented by Formula 2-B can have a polyester-derived structure obtained by a well-known polyester synthesis method. As the polyester synthesis method, ring-opening polymerization of lactone disclosed in paragraphs 0056 and 0057 of JP2015-28830A can be used. However, the structure of the polyester chain is not limited to the polyester-derived structure obtained by the ring-opening polymerization of lactone, and can be a polyester-derived structure obtained by a well-known polyester synthesis method, for example, polycondensation of polyvalent carboxylic acid and polyhydric alcohol or polycondensation of hydroxycarboxylic acid.

Number Average Molecular Weight of Polyester Chain

A number average molecular weight of the polyester chain is preferably equal to or greater than 200, more preferably equal to or greater than 400, and even more preferably equal to or greater than 500, from a viewpoint of improvement of dispersibility of ferromagnetic hexagonal ferrite powder. In addition, from the same viewpoint, the number average molecular weight of the polyester chain is preferably equal to or smaller than 100,000 and more preferably equal to or smaller than 50,000. As described above, it is considered that the polyester chain functions to cause steric hindrance in the magnetic layer forming composition and/or the magnetic solution and preventing the aggregation of the hexagonal ferrite particles. It is assumed that the polyester chain having the number average molecular weight described above can exhibit such an operation in an excellent manner. The number average molecular weight of the polyester chain is a value obtained by performing reference polystyrene conversion of a value measured by GPC, regarding polyester obtained by hydrolysis of a polyalkyleneimine derivative. The value acquired as described above is the same as a value obtained by performing reference polystyrene conversion of a value measured by GPC regarding polyester used for synthesis of the polyalkyleneimine derivative. Accordingly, the number average molecular weight acquired regarding polyester used for synthesis of the polyalkyleneimine derivative can be used as the number average molecular weight of the polyester chain included in the polyalkyleneimine derivative. For the measurement conditions of the number average molecular weight of the polyester chain, the measurement conditions of the number average molecular weight of polyester in a specific example which will be described later can be referred to.

Polyalkyleneimine Chain

Number Average Molecular Weight

The number average molecular weight of the polyalkyleneimine chain included in the polyalkyleneimine derivative is a value obtained by performing reference polystyrene conversion of a value measured by GPC, regarding polyalkyleneimine obtained by hydrolysis of a polyalkyleneimine derivative. The value acquired as described above is the same as a value obtained by performing reference polystyrene conversion of a value measured by GPC regarding polyalkyleneimine used for synthesis of the polyalkyleneimine derivative. Accordingly, the number average molecular weight acquired regarding polyalkyleneimine used for synthesis of the polyalkyleneimine derivative can be used as the number average molecular weight of the polyalkyleneimine chain included in the polyalkyleneimine derivative. For the measurement conditions of the number average molecular weight of the polyalkyleneimine chain, a specific example which will be described later can be referred to. In addition, the polyalkyleneimine is a polymer which can be obtained by ring-opening polymerization of alkyleneimine. In the polyalkyleneimine derivative, the term "polymer" is used to include a homopolymer including a repeating unit in the same structure and a copolymer including a repeating unit in two or more kinds of different structures.

The hydrolysis of the polyalkyleneimine derivative can be performed by various methods which are normally used as a hydrolysis method of ester. For details of such a method, description of a hydrolysis method disclosed in "The Fifth Series of Experimental Chemistry Vol. 14 Synthesis of Organic Compounds II—Alcohol.Amine" (Chemical Society of Japan, Maruzen Publication, issued August, 2005) pp. 95 to 98, and description of a hydrolysis method disclosed in "The Fifth Series of Experimental Chemistry Vol. 16 Synthesis of Organic Compounds IV-Carboxylic acid—Amino Acid—Peptide" (Chemical Society of Japan, Maruzen Publication, issued March, 2005) pp. 10 to 15 cam be referred to, for example.

The polyalkyleneimine is decomposed from the obtained hydrolyzate by well-known separating means such as liquid chromatography, and the number average molecular weight thereof can be acquired.

The number average molecular weight of the polyalkyleneimine chain included in the polyalkyleneimine derivative is in a range of 300 to 3,000. The inventors have surmised that when the number average molecular weight of the polyalkyleneimine chain is in the range described above, the polyalkyleneimine derivative can be effectively adsorbed to the surface of the hexagonal ferrite particles. The number average molecular weight of the polyalkyleneimine chain is preferably equal to or greater than 500, from a viewpoint of adsorption properties to the surface of the hexagonal ferrite particles. From the same viewpoint, the number average molecular weight is preferably equal to or smaller than 2,000.

Percentage of Polyalkyleneimine Chain Occupying Polyalkyleneimine Derivative

As described above, the inventors have considered that the polyalkyleneimine chain included in the polyalkyleneimine derivative can function as an adsorption part to the surface of the hexagonal ferrite particles. A percentage of the polyalkyleneimine chain occupying the polyalkyleneimine derivative (hereinafter, also referred to as a "polyalkyleneimine chain percentage") is preferably smaller than 5.0 mass %, from a viewpoint of increasing the dispersibility of the ferromagnetic hexagonal ferrite powder. From a viewpoint of improving the dispersibility of the ferromagnetic hexagonal ferrite powder, the polyalkyleneimine chain percentage is more preferably equal to or smaller than 4.9 mass %, even more preferably equal to or smaller than 4.8 mass %, further more preferably equal to or smaller than 4.5 mass %, still more preferably equal to or smaller than 4.0 mass %, and still even more preferably equal to or smaller than 3.0 mass %. In addition, from a viewpoint of improving the dispersibility of the ferromagnetic hexagonal ferrite powder, the polyalkyleneimine chain percentage is preferably equal to or greater than 0.2 mass %, more preferably equal to or greater than 0.3 mass %, and even more preferably equal to or greater than 0.5 mass %.

The percentage of the polyalkyleneimine chain described above can be controlled, for example, according to a mixing ratio of polyalkyleneimine and polyester used at the time of synthesis.

The percentage of the polyalkyleneimine chain occupying the polyalkyleneimine derivative can be calculated from an analysis result obtained by element analysis such as nuclear magnetic resonance (NMR), more specifically, $^1$H-NMR and $^{13}$C-NMR, and a well-known method. The value calculated as described is the same as a theoretical value acquired from a compounding ratio of a synthesis raw material in the polyalkyleneimine derivative, and thus, the theoretical value acquired from the compounding ratio can be used as the percentage of the polyalkyleneimine chain occupying the polyalkyleneimine derivative.

Structure of Polyalkyleneimine Chain

The polyalkyleneimine chain has a polymer structure including the same or two or more different alkyleneimine chains. As the alkyleneimine chain included, an alkyleneimine chain represented by Formula A and an alkyleneimine chain represented by Formula B can be used. In the alkyleneimine chains represented by the following formulae, the alkyleneimine chain represented by Formula A can include a bonding site with a polyester chain. In addition, the alkyleneimine chain represented by Formula B can be bonded to a polyester chain by the salt crosslinking group described above. The polyalkyleneimine derivative can have a structure in which one or more polyester chains are bonded to the polyalkyleneimine chain, by including one or more alkyleneimine chains. In addition, the polyalkyleneimine chain may be formed of only a linear structure or may have a branched tertiary amine structure. It is preferable that the polyalkyleneimine chain has a branched structure, from a viewpoint of further improving the dispersibility. As a component having a branched structure, a component bonded to an adjacent alkyleneimine chain at *$^1$ in Formula A and a component bonded to an adjacent alkyleneimine chain at *$^2$ in Formula B can be used.

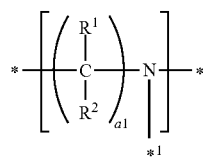

Formula A

In Formula A, $R^1$ and $R^2$ each independently represent a hydrogen atom or an alkyl group, a1 represents an integer equal to or greater than 2, and *$^1$ represents a bonding site with a polyester chain, an adjacent alkyleneimine chain, a hydrogen atom, or a substituent.

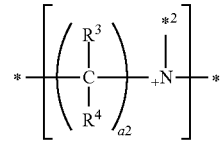

Formula B

In Formula B, $R^3$ and $R^4$ each independently represent a hydrogen atom or an alkyl group, and a2 represents an integer equal to or greater than 2. The alkyleneimine chain represented by Formula B is bonded to a polyester chain including an anionic group by forming a salt crosslinking group by N$^+$ in Formula B and an anionic group included in the polyester chain.

* in Formula A and Formula B and *$^2$ in Formula B each independently represent a site to be bonded to an adjacent alkyleneimine chain, a hydrogen atom, or a sub stituent.

Hereinafter, Formula A and Formula B will be further described in detail.

$R^1$ and $R^2$ in Formula A and $R^3$ and $R^4$ in Formula B each independently represent a hydrogen atom or an alkyl group. As the alkyl group, for example, an alkyl group having 1 to 6 carbon atoms can be used, and the alkyl group is preferably an alkyl group having 1 to 3 carbon atoms, more preferably a methyl group or an ethyl group, and even more preferably a methyl group. As an aspect of a combination of $R^1$ and $R^2$ in Formula A, an aspect in which one is a hydrogen atom and the other is an alkyl group, an aspect in which both of them are hydrogen atoms, and an aspect in which both of them are alkyl groups (alkyl groups which are the same as each other or different from each other) are used, and the aspect in which both of them are hydrogen atoms is preferably used. The point described above is also applied to $R^3$ and $R^4$ in Formula B in the same manner.

Ethyleneimine has a structure having the minimum number of carbon atoms configuring a ring as alkyleneimine, and the number of carbon atoms of a main chain of the alkyleneimine chain (ethyleneimine chain) obtained by ring opening of ethyleneimine is 2. Accordingly, the lower limit of a1 in Formula A and a2 in Formula B is 2. That is, a1 in Formula A and a2 in Formula B each independently represent an integer equal to or greater than 2. a1 in Formula A and a2 in Formula B are each independently preferably equal to or smaller than 10, more preferably equal to or smaller than 6, even more preferably equal to or smaller than 4, still more preferably 2 or 3, and still even more preferably 2, from a viewpoint of adhesiveness of the ferromagnetic powder to the surface of the particles.

The details of the bonding between the alkyleneimine chain represented by Formula A or the alkyleneimine chain represented by Formula B and the polyester chain are as described above.

Each alkyleneimine chain is bonded to an adjacent alkyleneimine chain, a hydrogen atom, or a substituent, at a position represented by * in each Formula. As the substituent, for example, a monovalent substituent such as an alkyl group (for example, an alkyl group having 1 to 6 carbon atoms) can be used, but there is no limitation. In addition, the polyester chain may be bonded as the substituent.

Weight-Average Molecular Weight of Polyalkyleneimine Derivative

A molecular weight of the polyalkyleneimine derivative is preferably 1,000 to 80,000 as the weight-average molecular weight as described above. The weight-average molecular weight of the polyalkyleneimine derivative is more preferably equal to or greater than 1,500, even more preferably equal to or greater than 2,000, and further more preferably equal to or greater than 3,000. In addition, the weight-average molecular weight of the polyalkyleneimine derivative is more preferably equal to or smaller than 60,000, even more preferably equal to or smaller than 40,000, and further more preferably equal to or smaller than 35,000, and still more preferably equal to or smaller than 34,000. For measurement conditions of the weight-average molecular weight of the polyalkyleneimine derivative, a specific example which will be described later can be referred to.

Synthesis Method

The synthesis method is not particularly limited, as long as the polyalkyleneimine derivative includes the polyester chain and the polyalkyleneimine chain having a number average molecular weight of 300 to 3,000 at the ratio described above. As a preferred aspect of the synthesis method, descriptions disclosed in paragraphs 0061 to 0069 of JP2015-28830A can be referred to.

As a specific example of the polyalkyleneimine derivative, various polyalkyleneimine derivatives shown in Table 2 synthesized by using polyethyleneimine and polyester shown in Table 2 can be used. For the details of the synthesis reaction, descriptions disclosed in Examples which will be described later and/or Examples of JP2015-28830A can be referred to.

TABLE 2

| Polyalkyleneimine (polyethyleneimine) derivative | Polyethyleneimine* | Polyethyleneimine amount (g) | Percentage of Polyalkyleneimine chain (polyethyleneimine chain) (mass %) | Polyester | Acid value (mgKOH/g) | Amine value (mgKOH/g) | Weight-average molecular weight |
|---|---|---|---|---|---|---|---|
| (J-1) | SP-018 | 5 | 4.8 | (i-1) | 22.2 | 28.6 | 15,000 |
| (J-2) | SP-006 | 2.4 | 2.3 | (i-2) | 35 | 17.4 | 7,000 |
| (J-3) | SP-012 | 4.5 | 4.3 | (i-3) | 6.5 | 21.2 | 22,000 |
| (J-4) | SP-006 | 5 | 4.8 | (i-4) | 4.9 | 11.8 | 34,000 |
| (J-5) | SP-003 | 5 | 4.8 | (i-5) | 10.1 | 15.2 | 19,000 |
| (J-6) | SP-018 | 1.2 | 1.2 | (i-6) | 68.5 | 22.4 | 8,000 |
| (J-7) | SP-018 | 3 | 2.9 | (i-7) | 39.9 | 16.8 | 13,000 |
| (J-8) | SP-012 | 2.5 | 2.4 | (i-8) | 15.5 | 18.9 | 18,000 |
| (J-9) | SP-006 | 5 | 4.8 | (i-9) | 11.1 | 16.8 | 22,000 |
| (J-10) | SP-003 | 4 | 3.8 | (i-10) | 4.4 | 14.1 | 24,000 |
| (J-11) | SP-012 | 0.3 | 0.3 | (i-11) | 8.1 | 7.8 | 28,000 |
| (J-12) | SP-018 | 1 | 1 | (i-1) | 28.8 | 6.7 | 15,000 |
| (J-13) | SP-012 | 5 | 4.8 | (i-6) | 61 | 28.2 | 4,000 |
| (J-14) | SP-006 | 2.4 | 2.3 | (i-11) | 30 | 17.4 | 6,000 |
| (J-15) | SP-006 | 2.4 | 2.3 | (i-12) | 42.8 | 18.1 | 6,300 |
| (J-16) | SP-006 | 2.4 | 2.3 | (i-13) | 43.7 | 17.9 | 5,900 |
| (J-17) | SP-006 | 2.4 | 2.3 | (i-14) | 42.5 | 17.1 | 5,300 |
| (J-18) | SP-006 | 2.3 | 2.4 | (i-15) | 37.5 | 19.4 | 7,300 |
| (J-19) | SP-006 | 2.3 | 2.4 | (i-16) | 24.6 | 16 | 9,800 |
| (J-20) | SP-006 | 2.3 | 2.4 | (i-17) | 27.5 | 26.1 | 9,300 |
| (J-21) | SP-006 | 2.3 | 2.4 | (i-18) | 31.7 | 8.9 | 8,900 |
| (J-22) | SP-006 | 2.3 | 2.4 | (i-19) | 15.3 | 13.9 | 15,100 |
| (J-23) | SP-006 | 2.3 | 2.4 | (i-20) | 38.1 | 22.4 | 7,580 |

(*Note)
Polyethyleneimine shown in Table 2 is as described below.
SP-003 (Polyethyleneimine (manufactured by Nippon Shokubai Co., Ltd.) number average molecular weight of 300)
SP-006 (Polyethyleneimine (manufactured by Nippon Shokubai Co., Ltd.) number average molecular weight of 600)
SP-012 (Polyethyleneimine (manufactured by Nippon Shokubai Co., Ltd.) number average molecular weight of 1,200)
SP-018 (Polyethyleneimine (manufactured by Nippon Shokubai Co., Ltd.) number average molecular weight of 1,800)

The polyester shown in Table 2 is polyester synthesized by the ring-opening polymerization of lactone by using lactone and a nucleophilic reagent (carboxylic acid) shown in Table 3. For the details of the synthesis reaction, descriptions disclosed in Examples which will be described later and/or Examples of JP2015-28830A can be referred to.

TABLE 3

| Polyester | Carboxylic acid | Amount of carboxylic acid (g) | Lactone | Weight-average molecular weight | Number average molecular weight | Number of lactone repeating units |
|---|---|---|---|---|---|---|
| (i-1) | n-Octanoic acid | 12.6 | ε-Caprolactone | 9,000 | 7,500 | 20 |
| (i-2) | n-Octanoic acid | 16.8 | ε-Caprolactone | 7,000 | 5,800 | 15 |
| (i-3) | n-Octanoic acid | 3.3 | L-Lactide | 22,000 | 18,000 | 60 |
| (i-4) | Palmitic acid | 4.5 | ε-Caprolactone | 38,000 | 31,000 | 100 |
| (i-5) | Palmitic acid | 12.8 | δ-Valerolactone | 16,000 | 13,000 | 40 |
| (i-6) | Stearic acid | 99.7 | ε-Caprolactone | 2,500 | 2,000 | 5 |
| (i-7) | Glycol acid | 13.3 | ε-Caprolactone | 4,800 | 4,000 | 10 |
| (i-8) | 12-Hydroxystearic acid | 20 | δ-Valerolactone | 13,000 | 10,000 | 30 |

TABLE 3-continued

| Polyester | Carboxylic acid | Amount of carboxylic acid (g) | Lactone | Weight-average molecular weight | Number average molecular weight | Number of lactone repeating units |
|---|---|---|---|---|---|---|
| (i-9) | 12-Hydroxystearic acid | 13.2 | ε-Caprolactone | 17,000 | 14,000 | 40 |
| (i-10) | 2-Naphthoic acid | 3.8 | ε-Caprolactone | 27,000 | 22,500 | 80 |
| (i-11) | [2-(2-Methoxyethoxy)ethoxy] acetic acid | 15.6 | ε-Caprolactone | 8,700 | 6,300 | 15 |
| (i-12) | n-Octanoic acid | 16.8 | Lactide | 8,100 | 4,100 | 15 |
| (i-13) | n-Octanoic acid | 17.31 | L-Lactide ε-Caprolactone | 6,900 | 3,500 | 10 (L-Lactide derived) 5 (ε-Caprolactone derived) |
| (i-14) | n-Octanoic acid | 17.31 | L-Lactide ε-Caprolactone | 6,200 | 3,200 | 5 (L-Lactide dreived) 10 (ε-Caprolactone derived) |
| (i-15) | Nonafluorovaleric acid | 30.8 | ε-Caprolactone | 9,000 | 7,500 | 15 |
| (i-16) | Heptadecafluorononanoic acid | 54.2 | ε-Caprolactone | 8,000 | 5,000 | 15 |
| (i-17) | 3,5,5-Trimethylhexanoic acid | 18.5 | ε-Caprolactone | 10,000 | 5,800 | 15 |
| (i-18) | 4-Oxovaleric acid | 13.6 | ε-Caprolactone | 7,400 | 4,100 | 15 |
| (i-19) | [2-(2-Methoxyethoxy)ethoxy] acetic acid | 20.8 | ε-Caprolactone | 15,300 | 11,500 | 30 |
| (i-20) | Benzoic acid | 14.3 | ε-Caprolactone | 7,000 | 3,000 | 15 |

The acid value and amine value described above are determined by a potentiometric method (solvent: tetrahydrofuran/water=100/10 (volume ratio), titrant: 0.01 N (0.01 mol/l), sodium hydroxide aqueous solution (acid value), 0.01 N (0.01 mol/l) hydrochloric acid (amine value)).

The average molecular weight (number average molecular weight and weight-average molecular weight) is acquired by performing reference polystyrene conversion of a value measured by GPC.

Specific examples of the measurement conditions of the average molecular weights of polyester, polyalkyleneimine, and a polyalkyleneimine derivative are respectively as described below.

Measurement Conditions of Average Molecular Weight of Polyester

Measurement device: HLC-8220 GPC (manufactured by Tosoh Corporation)

Column: TSK gel Super HZ2000/TSK gel Super HZ 4000/TSK gel Super HZ-H (manufactured by Tosoh Corporation)

Eluent: Tetrahydrofuran (THF)

Flow rate: 0.35 mL/min

Column temperature: 40° C.

Detector: differential refractometry (RI) detector

Measurement Conditions of Average Molecular Weight of Polyalkyleneimine and Average Molecular Weight of Polyalkyleneimine Derivative Measurement device: HLC-8320 GPC (manufactured by Tosoh Corporation)

Column: three TSK gel Super AWM-H (manufactured by Tosoh Corporation)

Eluent: N-methyl-2-pyrrolidone (10 mmol/l of lithium bromide is added as an additive)

Flow rate: 0.35 mL/min

Column temperature: 40° C.

Detector: differential refractometry (RI) detector

The content of the dispersing agent for improving dispersibility of the ferromagnetic hexagonal ferrite powder described above is preferably 0.5 to 25.0 parts by mass with respect to 100.0 parts by mass of the ferromagnetic hexagonal ferrite powder. The content of the dispersing agent is preferably equal to or greater than 0.5 parts by mass, more preferably equal to or greater than 1.0 part by mass, even more preferably equal to or greater than 5.0 parts by mass, and still more preferably equal to or greater than 10.0 parts by mass, with respect to 100.0 parts by mass of the ferromagnetic hexagonal ferrite powder, from viewpoints of improving the dispersibility of the ferromagnetic hexagonal ferrite powder and the durability of the magnetic layer. Meanwhile, it is preferable to increase the filling percentage of the ferromagnetic hexagonal ferrite powder of the magnetic layer, in order to improve recording density. From this point, it is preferable that the content of the components other than the ferromagnetic hexagonal ferrite powder is relatively low. From the viewpoints described above, the content of the dispersing agent for improving dispersibility of the ferromagnetic hexagonal ferrite powder is preferably equal to or smaller than 25.0 parts by mass, more preferably equal to or smaller than 20.0 parts by mass, even more preferably equal to or smaller than 18.0 parts by mass, and still more preferably equal to or smaller than 15.0 parts by mass with respect to 100.0 parts by mass of the ferromagnetic hexagonal ferrite powder.

Hereinafter, the magnetic tape will be further described in detail.

Magnetic Layer

Ferromagnetic Powder

The magnetic layer includes ferromagnetic hexagonal ferrite powder as the ferromagnetic powder. As an index of a particle size of the ferromagnetic hexagonal ferrite powder, an activation volume can be used. The "activation volume" is a unit of magnetization reversal. Regarding the activation volume described in the invention and the specification, magnetic field sweep rates of a coercivity Hc measurement part at time points of 3 minutes and 30 minutes are measured by using an oscillation sample type magnetic-flux meter in an environment of an atmosphere temperature of 23° C.±1° C., and the activation volume is a value acquired from the following relational expression of Hc and an activation volume V.

$$Hc = 2Ku/Ms\{1-[(kT/KuV)\ln(At/0.693)]^{1/2}\}$$

[In the expression, Ku: anisotropy constant, Ms: saturation magnetization, k: Boltzmann's constant, T: absolute temperature, V: activation volume, A: spin precession frequency, and t: magnetic field reversal time]

It is desired that recording density is increased (high-density recording is realized) in the magnetic tape, in accordance with a great increase in information content of recent years. As a method for achieving high-density recording, a method of decreasing a particle size of ferromagnetic powder included in a magnetic layer and increasing a filling percentage of the ferromagnetic powder of the magnetic layer is used. From this viewpoint, the activation volume of the ferromagnetic hexagonal ferrite powder is preferably equal to or smaller than 2,500 nm$^3$, more preferably equal to or smaller than 2,300 nm$^3$, and even more preferably equal to or smaller than 2,000 nm$^3$. Meanwhile, from a viewpoint of stability of magnetization, the activation volume is, for example, preferably equal to or greater than 800 nm$^3$, more preferably equal to or greater than 1,000 nm$^3$, and even more preferably equal to or greater than 1,200 nm$^3$. A percentage of the hexagonal ferrite particles having the aspect ratio and the length in the long axis direction described above in all of the hexagonal ferrite particles observed in the STEM image, can be, for example, equal to or greater than 50%, as a percentage with respect to all of the hexagonal ferrite particles observed in the STEM image, based on the particle number. In addition, the percentage can be, for example, equal to or smaller than 95% and can exceed 95%.

As one aspect of the ferromagnetic hexagonal ferrite powder, ferromagnetic hexagonal ferrite powder including Al can be used. It is thought that, the ferromagnetic hexagonal ferrite powder is hardened by including Al and contributes to the improvement of strength of the magnetic layer. The Al content of the ferromagnetic hexagonal ferrite powder is preferably equal to or greater than 0.6 mass %, more preferably equal to or greater than 1.0 mass %, even more preferably equal to or greater than 2.0 mass %, and still more preferably equal to or greater than 3.0 mass % in terms of $Al_2O_3$, with respect to 100.0 mass % of the total mass of the ferromagnetic hexagonal ferrite powder. In addition, the Al content of the ferromagnetic hexagonal ferrite powder is preferably equal to or smaller than 12.0 mass %, more preferably equal to or smaller than 10.0 mass %, even more preferably equal to or smaller than 8.0 mass %, and still more preferably equal to or smaller than 6.0 mass % in terms of $Al_2O_3$, with respect to 100.0 mass % of the total mass of the ferromagnetic hexagonal ferrite powder.

Al may be present in the particle of the ferromagnetic hexagonal ferrite powder, may be adhered to the surface of the particle, or may be present in the particle and on the surface thereof.

The Al content of the ferromagnetic hexagonal ferrite powder can be calculated from an Al/Fe ratio acquired by inductively coupled plasma (ICP) analysis. In addition, the Al adhered to the surface of the particle can be confirmed by one or more analysis methods of: confirming that an Al/Fe ratio of a surface layer of a particle acquired by X-ray photoelectron spectroscopy (XPS) analysis becomes greater than the Al/Fe ratio acquired by the ICP analysis; observing localization of Al on the surface layer of the particle in Auger electron spectroscopy (AES) analysis; and confirming a coated film on the surface of the particle in a cross section observation performed by using a transmission electron microscope (TEM). It is surmised that Al present on the surface of the particle is normally in a state of an oxide.

For a preparation method of the ferromagnetic hexagonal ferrite powder including Al, description disclosed in paragraphs 0012 to 0030 of JP2011-225417A can be referred to. According to the preparation method disclosed in JP2011-225417A, the ferromagnetic hexagonal ferrite powder in which surfaces of primary particles of hexagonal ferrite particles are coated with Al can also be obtained by a glass crystallization method. In addition, for the preparation method of the ferromagnetic hexagonal ferrite powder including Al, description disclosed in a paragraph 0035 of JP2014-179149A can also be referred to.

For details of ferromagnetic hexagonal ferrite powder, for example, descriptions disclosed in paragraphs 0134 0136 of JP2011-216149A and paragraphs 0013 to 0030 of JP2012-204726A can be referred to.

The content (filling percentage) of the ferromagnetic hexagonal ferrite powder of the magnetic layer is preferably in a range of 50 to 90 mass % and more preferably in a range of 60 to 90 mass %. The component other than the ferromagnetic hexagonal ferrite powder of the magnetic layer is at least a binding agent and an abrasive, and one or more kinds of additives can be arbitrarily included. The high filling percentage of the ferromagnetic hexagonal ferrite powder of the magnetic layer is preferable, from a viewpoint of improving recording density.

Binding Agent

The magnetic tape includes a binding agent in the magnetic layer. The binding agent is one or more kinds of resin. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later. For the binding agent described above, description disclosed in paragraphs 0028 to 0031 of JP2010-24113A can be referred to. In addition, the binding agent may be a radiation curable resin such as an electron beam-curable resin. For the radiation curable resin, descriptions disclosed in paragraphs 0044 and 0045 of JP2011-48878A can be referred to.

In addition, a curing agent can be used together with a resin which can be used as the binding agent. The curing agent is a compound including at least one and preferably two or more crosslinking functional groups in one molecule. At least a part of the curing agent is included in the magnetic layer in a state of being reacted (crosslinked) with other components such as the binding agent, by proceeding the curing reaction in the magnetic layer forming step. As the curing agent, polyisocyanate is suitable. For the details of polyisocyanate, descriptions disclosed in paragraphs 0124 and 0125 of JP2011-216149A can be referred to. The amount of the curing agent used can be, for example, 0 to 80.0 parts by mass with respect to 100.0 parts by mass of the binding agent, and is preferably 50.0 to 80.0 parts by mass, from a viewpoint of improvement of strength of each layer such as the magnetic layer.

Additives

The magnetic layer includes ferromagnetic hexagonal ferrite powder, a binding agent, and an abrasive, and may further include one or more kinds of additives, if necessary. As the additives, a commercially available product or an additive prepared by a well-known method can be suitably selected and used according to desired properties.

As specific examples of the additives, the dispersing agent and the curing agent described above are used. The dispersing agent for improving dispersibility of the ferromagnetic hexagonal ferrite powder can also contribute to the improvement of dispersibility of the abrasive. The dispersing agent for improving dispersibility of the abrasive can also contribute to the improvement of dispersibility of the ferromagnetic hexagonal ferrite powder. In addition, examples of the additive which can be included in the magnetic layer include a non-magnetic filler, a lubricant, a dispersing assistant, an antibacterial agent, an antistatic agent, an antioxidant, and carbon black. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer can be used. The projection formation agent is a component which can contribute to the control of friction properties of the surface of the magnetic layer. As the projection formation agent, various non-magnetic powders normally used as a projection formation agent can be used. These may be inorganic powder or organic powder. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably inorganic powder. Examples of the inorganic powder include powder of metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. In addition, in another aspect, the projection formation agent is preferably carbon black. An average particle size of the projection formation agent is, for example, 30 to 300 nm and is preferably 40 to 200 nm. In addition, from a viewpoint that the projection formation agent can exhibit the functions thereof in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder.

Non-Magnetic Layer

Next, the non-magnetic layer will be described. The magnetic tape includes a non-magnetic layer including non-magnetic powder and a binding agent between the non-magnetic support and the magnetic layer. The non-magnetic powder used in the non-magnetic layer may be inorganic powder or organic powder. In addition, carbon black and the like can also be used. Examples of the inorganic powder include powders of metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably in a range of 50 to 90 mass % and more preferably in a range of 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Back Coating Layer

The magnetic tape can also include a back coating layer including non-magnetic powder and a binding agent on a side of the non-magnetic support opposite to the side including the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or thermal treatment may be performed with respect to these supports in advance.

Various Thickness

The total thickness of the magnetic layer and the non-magnetic layer of the magnetic tape is as described above.

A thickness of the non-magnetic support of the magnetic tape is preferably 3.00 to 4.50 µm.

A thickness of the magnetic layer can be optimized in accordance with saturation magnetization quantity of the magnetic head used, a head gap length, or a band of a recording signal. The thickness of the magnetic layer is normally 0.01 µm to 0.15 µm, and is preferably 0.02 µm to 0.12 µm and more preferably 0.03 µm to 0.10 µm, from a viewpoint of realizing recording at high density. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.10 to 0.55 µm and is preferably 0.10 to 0.50 µm.

A thickness of the back coating layer is preferably equal to or smaller than 0.90 µm and even more preferably in a range of 0.10 to 0.70 µm.

In addition, the total thickness of the magnetic tape is preferably equal to or smaller than 6.00 µm, more preferably equal to or smaller than 5.70 µm, and even more preferably equal to or smaller than 5.50 µm, from a viewpoint of improving recording capacity for 1 reel of the magnetic tape cartridge. Meanwhile, the total thickness of the magnetic tape is preferably equal to or greater than 1.00 μm, from a viewpoint of availability (handling properties) of the magnetic tape.

Manufacturing Method of Magnetic Tape

Each composition for forming the magnetic layer, the non-magnetic layer, or the back coating layer normally includes a solvent, together with various components described above. As the solvent, various organic solvents generally used for manufacturing a coating type magnetic tape can be used. The steps of preparing a composition for forming each layer generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. In the preparation of the magnetic layer forming composition, it is preferable that the abrasive and the ferromagnetic hexagonal ferrite powder are separately dispersed as described above. For the preparation method of the abrasive liquid and the magnetic solution used in the separate dispersing and the preparation method of the magnetic layer forming composition, descriptions disclosed in paragraph 0042 to 0048 of JP2014-179149A can be referred to. In addition, in order to manufacture the magnetic tape, a well-known manufacturing technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and one or more kinds of other dispersion beads can be used as a dispersion medium. As such dispersion beads, zirconia beads, titania beads, and steel beads which are dispersion beads having high specific gravity are suitable. These dispersion beads are preferably used by optimizing a particle diameter (bead diameter) and a filling percentage of the dispersion beads. As a dispersion device, a well-known dispersion device can be used. As one of means for obtaining a magnetic tape having cos θ of 0.85 to 1.00, a technology of reinforcing the dispersion conditions (for example, increasing the dispersion time, decreasing the diameter of the dispersion beads used for dispersion and/or increasing the filling percentage of the dispersion beads, using the dispersing agent, and the like) is also preferable. A preferred aspect regarding the reinforcing of the dispersion conditions is as described above. For other details of the manufacturing method of the magnetic tape, for example, descriptions disclosed in paragraphs 0051 to 0057 of JP2010-24113A can be referred to. For the orientation process, a description disclosed in a paragraph 0052 of JP2010-24113A can be referred to. As one of means for obtaining a magnetic tape having cos θ of 0.85 to 1.00, a vertical orientation process is preferably performed.

The magnetic tape according to one aspect of the invention described above is normally used to be accommodated and circulated in a magnetic tape cartridge, in order to record and reproduce a signal. It is possible to record a signal to the magnetic tape and reproduce the recorded signal by mounting the magnetic tape cartridge on a drive and allowing the running of the magnetic tape in the drive. In the magnetic tape, although the total thickness of the non-magnetic layer and the magnetic layer is equal to or smaller than 0.60 μm, it is possible to prevent a deterioration of electromagnetic conversion characteristics while repeating the running in a low temperature and high humidity environment.

EXAMPLES

Hereinafter, the invention will be described with reference to Examples. However, the invention is not limited to aspects shown in Examples. "Parts" and "%" in the following description mean "parts by mass" and "mass %", unless otherwise noted. In addition, steps and evaluations described below are performed in an environment of an atmosphere temperature of 23° C.±1° C., unless otherwise noted.

An average particle size of the powder of the invention and the specification is a value measured by a method disclosed in paragraphs 0058 to 0061 of JP2016-071926A. The measurement of the average particle size described below was performed by using transmission electron microscope H-9000 manufactured by Hitachi, Ltd. as the transmission electron microscope, and image analysis software KS-400 manufactured by Carl Zeiss as the image analysis software.

Preparation Examples of Ferromagnetic Hexagonal Ferrite Powders 1 and 2

In the method disclosed in Example 1 of JP2011-225417A, an Al adhesion amount was adjusted by changing the amount of $Al_2O_3$ added to a raw material mixture, a particle size was adjusted by changing a crystallization temperature, and ferromagnetic hexagonal ferrite powders 1 and 2 (barium ferrite powders) in which $Al_2O_3$ was adhered to the surface of the particle were manufactured.

Regarding the manufactured ferromagnetic hexagonal ferrite powders 1 and 2, the magnetic field sweep rates of the Hc measurement part at time points of 3 minutes and 30 minutes were measured by using an oscillation sample type magnetic-flux meter (manufactured by Toei Industry Co., Ltd.), and the activation volume was calculated from the relational expression described above. In Table 4 below, ferromagnetic hexagonal ferrite powder having an activation volume of 2,000 $nm^3$ is the ferromagnetic hexagonal ferrite powder 1 and ferromagnetic hexagonal ferrite powder having an activation volume of 1,600 $nm^3$ is the ferromagnetic hexagonal ferrite powder 2.

In addition, regarding the manufactured ferromagnetic hexagonal ferrite powders 1 and 2, the Al content was measured and the Al presence state was confirmed by the method disclosed in a paragraph 0070 of JP2014-179149A. In both of the ferromagnetic hexagonal ferrite powders 1 and 2, the Al content was 3.0 mass % in terms of $Al_2O_3$ with respect to 100.0 mass % which is the total mass of the ferromagnetic hexagonal ferrite powder used in the measurement. In addition, in both of the ferromagnetic hexagonal ferrite powders 1 and 2, it was confirmed that Al is adhered onto the primary particles (specifically, a coated film including Al is present).

Examples 1 to 9 and Comparative Examples 1 to 10

1. Preparation of Alumina Dispersion (Abrasive Liquid)

2,3-dihydroxynaphthalene (manufactured by Tokyo Chemical Industry Co., Ltd.) having the amount shown in Table 4, 31.3 parts of 32% solution (solvent is a mixed solvent of methyl ethyl ketone and toluene) of a polyester polyurethane resin having a $SO_3Na$ group as a polar group (UR-4800 manufactured by Toyobo Co., Ltd. (amount of a polar group: 80 meq/kg)), and 570.0 parts of a mixed liquid of methyl ethyl ketone and cyclohexanone at 1:1 (mass ratio) as a solvent were mixed with 100.0 parts of alumina powder (Mohs hardness of 9) having a gelatinization ratio of approximately 65% and a BET specific surface area of 20 $m^2/g$ shown in Table 4, and dispersed in the presence of zirconia beads by a paint shaker for the time shown in Table 4. After the dispersion, the dispersion liquid and the beads were separated by a mesh and an alumina dispersion (abrasive liquid) was obtained.

2. Magnetic Layer Forming Composition List
Magnetic Solution
Ferromagnetic hexagonal barium ferrite powder (activation volume: see Table 4): 100.0 parts
$SO_3Na$ group-containing polyurethane resin: 14.0 parts
(Weight-average molecular weight: 70,000, $SO_3Na$ group: 0.2 meq/g)
Dispersing agent: see Table 4
Cyclohexanone: 150.0 parts
Methyl ethyl ketone: 150.0 parts
Abrasive liquid
Alumina dispersion prepared in the section 1: 6.0 parts
Silica Sol (Projection Forming Agent Liquid)
Colloidal silica (average particle size of 100 nm): 2.0 parts
Methyl ethyl ketone: 1.4 parts
Other Components
Stearic acid: 2.0 parts
Butyl stearate: 6.0 parts
Polyisocyanate (CORONATE (registered trademark) manufactured by Nippon Polyurethane Industry): 2.5 parts
Finishing Additive Solvent
Cyclohexanone: 200.0 parts
Methyl ethyl ketone: 200.0 parts
The synthesis method or the like of the dispersing agent shown in Table 4 will be described later in detail.

3. Non-Magnetic Layer Forming Composition List
Nonmagnetic inorganic powder: α-iron oxide: 100.0 parts
Average particle size (average long axis length): 0.15 μm
Average acicular ratio: 7
BET specific surface area: 52 $m^2/g$
Carbon black: 20.0 parts
Average particle size: 20 nm
$SO_3Na$ group-containing polyurethane resin: 18.0 parts
(Weight-average molecular weight: 70,000, $SO_3Na$ group: 0.2 meq/g)
Stearic acid: 1.0 part
Cyclohexanone: 300.0 parts
Methyl ethyl ketone: 300.0 parts 4. Back Coating Layer Forming Composition List
Nonmagnetic inorganic powder: α-iron oxide: 80.0 parts
Average particle size (average long axis length): 0.15 μm
Average acicular ratio: 7
BET specific surface area: 52 $m^2/g$
Carbon black: 20.0 parts
Average particle size: 20 nm
A vinyl chloride copolymer: 13.0 parts
Sulfonic acid salt group-containing polyurethane resin: 6.0 parts
Phenylphosphonic acid: 3.0 parts
Methyl ethyl ketone: 155.0 parts
Stearic acid: 3.0 parts
Butyl stearate: 3.0 parts
Polyisocyanate: 5.0 parts
Cyclohexanone: 355.0 parts 5. Preparation of Each Layer Forming Composition
(1) Preparation of Magnetic Layer Forming Composition
The magnetic layer forming composition was prepared by the following method.
A magnetic solution was prepared by performing beads dispersing of the magnetic solution components described above by using beads as the dispersion medium in a batch type vertical sand mill. Specifically, the dispersing process was performed for the dispersion retention time shown in Table 4 by using zirconia beads having a bead diameter shown in Table 4, as the beads dispersion of each stage (first stage, second stage, or third stage). In the beads dispersion, dispersion liquid obtained by using filter (average hole diameter of 5 μm) was filtered after completion of each stage. In the beads dispersion of each stage, the filling percentage of the dispersion medium was set to be approximately 50 to 80 volume %.

The magnetic solution obtained as described above was mixed with the abrasive liquid, silica sol, other components, and the finishing additive solvent and beads-dispersed for the time shown in Table 4 by using the sand mill, and ultrasonic dispersion was performed with a batch type ultrasonic device (20 kHz, 300 W) for the time shown in Table 4. After that, the obtained mixed liquid was filtered by using a filter (average hole diameter: see Table 4), and the magnetic layer forming composition was prepared.

A circumferential speed of a tip of the sand mill at the time of beads dispersion was in a range of 7 to 15 msec.

(2) Preparation of Non-Magnetic Layer Forming Composition
The non-magnetic layer forming composition was prepared by the following method.
Each component excluding stearic acid, cyclohexanone, and methyl ethyl ketone was beads-dispersed by using a batch type vertical sand mill (dispersion medium: zirconia beads (bead diameter: 0.1 mm), dispersion retention time: 24 hours) to obtain dispersion liquid. After that, the remaining components were added into the obtained dispersion liquid and stirred with a dissolver. Then, the obtained dispersion liquid was filtered by using the filter (average hole diameter of 0.5 μm), and a non-magnetic layer forming composition was prepared.

(3) Preparation of Back Coating Layer Forming Composition
The back coating layer forming composition was prepared by the following method.
Each component excluding stearic acid, butyl stearate, polyisocyanate, and cyclohexanone was kneaded and diluted by an open kneader. Then, the obtained mixed liquid was subjected to a dispersing process of 12 passes, with a transverse beads mill by using zirconia beads having a bead diameter of 1 mm, by setting a bead filling percentage as 80 volume %, a circumferential speed of rotor tip as 10 msec, and a retention time for 1 pass as 2 minutes. After that, the remaining components were added into the obtained dispersion liquid and stirred with a dissolver. Then, the obtained dispersion liquid was filtered with a filter (average hole diameter of 1 μm) and a back coating layer forming composition was prepared.

6. Manufacturing of Magnetic Tape in Which Servo Pattern Is Formed
The non-magnetic layer forming composition prepared in the section 5. (2) was applied to the surface of a support made of polyethylene naphthalate having a thickness shown in Table 4 so that the thickness after the drying becomes the thickness shown in Table 4 and dried, to form a non-magnetic layer. Then, the magnetic layer forming composition prepared in the section 5. (1) was applied onto the non-magnetic layer so that the thickness after the drying becomes the thickness shown in Table 4. In Examples and Comparative Examples in which "performed" was shown in the column of the vertical orientation process in Table 4, the vertical orientation process was performed by applying a magnetic field having a magnetic field strength of 0.3 T to the coating surface in a vertical direction, while the coated magnetic layer forming composition was not dried, and then, the drying was performed to form the magnetic layer. In Comparative Examples in which "not performed" was shown in the column of the vertical orientation process in Table 4, the coated magnetic layer forming composition was dried without performing the vertical orientation process to form the magnetic layer.

After that, the back coating layer forming composition prepared in the section 5. (3) was applied to the surface of the support made of polyethylene naphthalate on a side opposite to the surface where the non-magnetic layer and the magnetic layer are formed, so that the thickness after the drying becomes the thickness shown in Table 4, and drying was performed to obtain a laminate.

Then, a surface smoothing treatment (calender process) was performed with respect to the obtained laminate with a calender roll configured of only a metal roll, at a calender process speed of 100 m/min, linear pressure of 294 kN/m (300 kg/cm), and a surface temperature of a calender roll of 95° C.

After that, a thermal treatment was performed in the environment of the atmosphere temperature of 70° C. for 36 hours. The laminate subjected to the thermal treatment was cut to have a width of ½ inches (0.0127 meters) by using a slitter, and a magnetic tape was manufactured.

By performing the steps described above, the magnetic tapes of Examples 1 to 9 and Comparative Examples 1 to 10 were manufactured. The thickness of each layer and the non-magnetic support of the manufactured magnetic tape was acquired by the following method. It was confirmed that the thickness of each layer and the non-magnetic support formed is the thickness shown in Table 4.

The cross section of the magnetic tape in a thickness direction was exposed by an ion beam, and then, the cross section observation of the exposed cross section was performed with a scanning electron microscope. Various thicknesses were acquired as an arithmetical mean of thicknesses acquired at two positions in the thickness direction, in the cross section observation.

7. Preparation of Dispersing Agent

Dispersing agents 1 to 3 shown in Table 4 used in the magnetic solution were prepared by the following method. Hereinafter, a temperature shown regarding the synthesis reaction is a temperature of a reaction liquid.

In Comparative Example 8,2,3-dihydroxynaphthalene was used in the magnetic solution instead of the dispersing agents 1 to 3. 2,3-dihydroxynaphthalene is a compound used as an additive of the magnetic layer forming composition, in order to adjust a squareness ratio in JP2012-203955A.

(1) Preparation of Dispersing Agent 1
Synthesis of Precursor 1

197.2 g of ε-caprolactone and 15.0 g of 2-ethyl-1-hexanol were introduced into a 500 mL three-neck flask and stirred and dissolved while blowing nitrogen. 0.1 g of monobutyltin oxide was added thereto and heated to 100° C. After 8 hours, the elimination of the raw material was confirmed by gas chromatography, the resultant material was cooled to room temperature, and 200 g of a solid precursor 1 (following structure) was obtained.

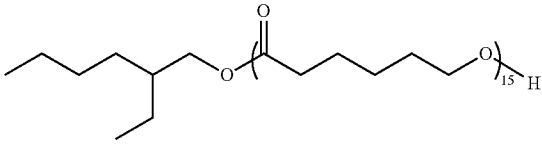

Synthesis of Dispersing Agent 1

40.0 g of the obtained precursor 1 was introduced into 200 mL three-neck flask, and stirred and dissolved at 80° C. while blowing nitrogen. 2.2 g of meso-butane-1,2,3,4-tetracarboxylic dianhydride was added thereto and heated to 110° C. After 5 hours, the elimination of a peak derived from the precursor 1 was confirmed by $^1$H-NMR, and then, the resultant material was cooled to room temperature, and 38 g of a solid reaction product 1 (mixture of the following structural isomer) was obtained. The reaction product 1 obtained as described above is a mixture of the compound 1 shown in Table 1 and the structural isomer. The reaction product 1 is called a "dispersing agent 1".

(Reaction Product 1)

Dispersing Agent 1

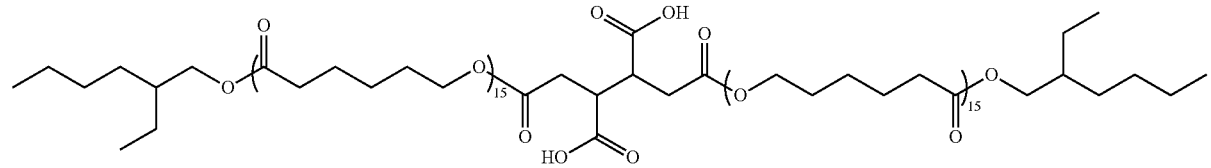

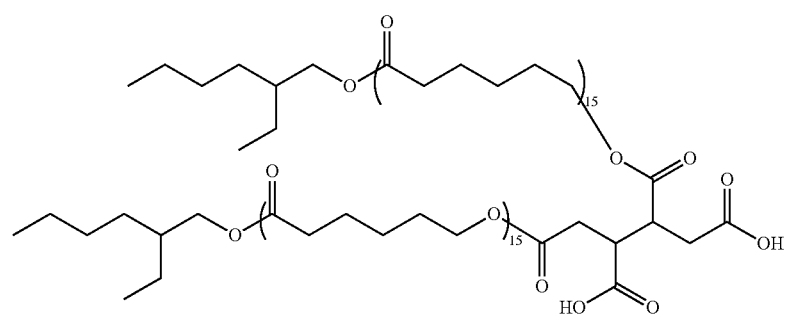

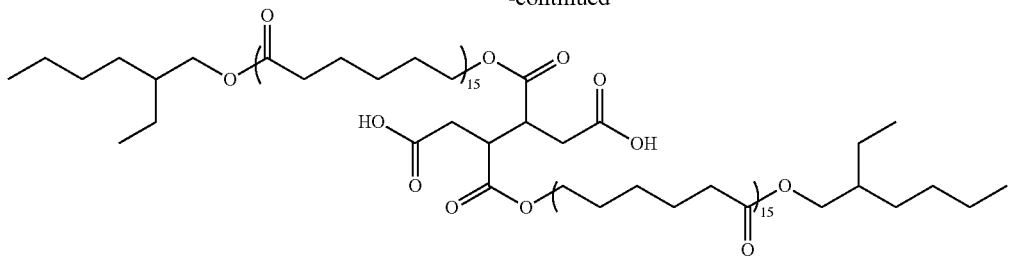

(2) Preparation of Dispersing Agent 2

Synthesis of Dispersing Agent 2

The synthesis was performed in the same manner as in the synthesis of the dispersing agent 1, except for changing 2.2 g of butanetetracarboxylic acid anhydride and 2.4 g of pyromellitic acid dianhydride, and 38 g of a solid reaction product 2 (mixture of the following structural isomer) was obtained. The reaction product 2 obtained as described above is a mixture of the compound 2 shown in Table 1 and the structural isomer. The reaction product 2 is called a "dispersing agent 2".

The synthesis scheme will be described below.

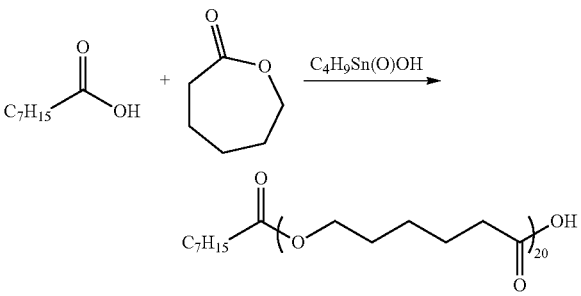

(Reaction Product 2)

Dispersing Agent 2

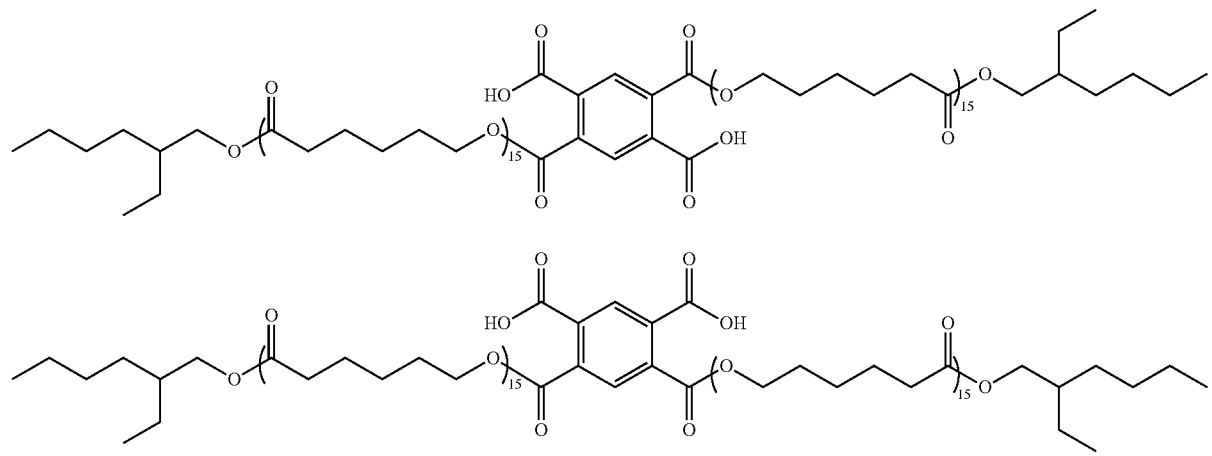

(3) Preparation of Dispersing Agent 3

Synthesis of Polyester (i-1)

12.6 g of n-octanoic acid (manufactured by Wako Pure Chemical Industries, Ltd.) as carboxylic acid, 100 g of ε-caprolactone (PLACCEL M manufactured by Daicel Corporation) as lactone, and 2.2 g of monobutyl tin oxide (manufactured by Wako Pure Chemical Industries, Ltd.) ($C_4H_9Sn(O)OH$) as a catalyst were mixed with each other in a 500 mL three-neck flask, and heated at 160° C. for 1 hour. 100 g of ε-caprolactone was added dropwise for 5 hours, and further stirred for 2 hours. After that, the cooling was performed to room temperature, and polyester (i-1) was obtained.

Synthesis of Dispersing Agent 3 (Polyethyleneimine Derivative (J-1))

5.0 g of polyethyleneimine (SP-018 manufactured by Nippon Shokubai Co., Ltd., number average molecular weight of 1,800) and 100 g of the obtained polyester (i-1) were mixed with each other and heated at 110° C. for 3 hours, to obtain a polyethyleneimine derivative (J-1). The polyethyleneimine derivative (J-1) is called a "dispersing agent 3".

The synthesis scheme is shown below. In the following synthesis scheme, a, b, c respectively represent a polymerization molar ratio of the repeating unit and is 0 to 50, and a relationship of a+b+c=100 is satisfied. 1, m, n1, and n2 respectively represent a polymerization molar ratio of the repeating unit, 1 is 10 to 90, m is 0 to 80, n1 and n2 are 0 to 70, and a relationship of 1+m+n1+n2=100 is satisfied.

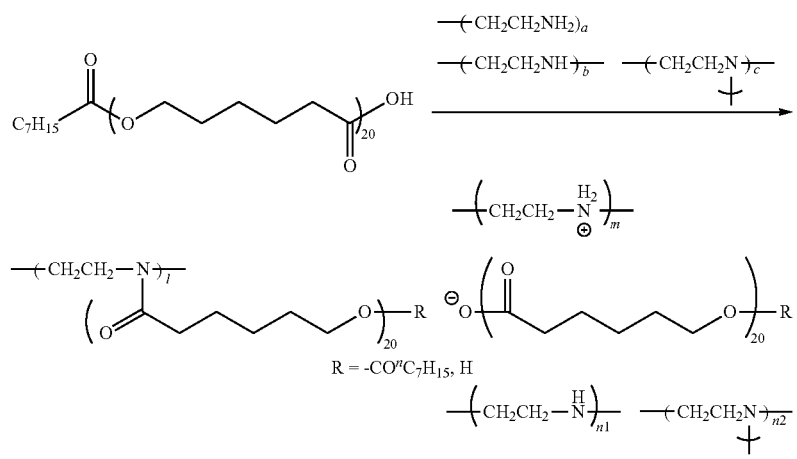

The weight-average molecular weight of the dispersing agents 1 and 2 was measured by a method described above as the measurement method of the weight-average molecular weight of the compound represented by General Formula 1. As a result of the measurement, the weight-average molecular weight of the dispersing agent 1 was 9,200 and the weight-average molecular weight of the dispersing agent 2 was 6,300.

The weight-average molecular weight of the dispersing agent 3 (polyethyleneimine derivative (J-1)) was a value shown in Table 3, when the value was acquired by performing reference polystyrene conversion of a value measured by GPC under the measurement conditions of the specific example described above.

The weight-average molecular weight other than that described above is a value acquired by performing reference polystyrene conversion of a value measured by GPC under the following measurement conditions.

GPC device: HLC-8120 (manufactured by Tosoh Corporation)

Column: TSK gel Multipore HXL-M (manufactured by Tosoh Corporation, 7.8 mm (internal diameter)×30.0 cm)

Eluent: Tetrahydrofuran (THF)

8. State of Abrasive Present in Magnetic Layer (Plan View Maximum Area Percentage of Abrasive)

By the method described above, the plan view maximum area percentage of the abrasive confirmed in a region having a size of 4.3 μm×6.3 μm of the surface of the magnetic layer is acquired.

9. Measurement of cos θ

A cross section observation sample was cut out from each magnetic tape of Examples and Comparative Examples, and cos θ was acquired by the method described above by using this sample. In each magnetic tape of Examples and Comparative Examples, acquired cos θ is shown in Table 4. In each magnetic tape of Examples and Comparative Examples, a percentage of hexagonal ferrite particles having the aspect ratio and the length in the long axis direction of the ranges described above which is a measurement target of cos θ occupying all of the hexagonal ferrite particles observed in the STEM image, was approximately 80% to 95% based on the particle number.

The cross section observation sample used for the measurement of cos θ was manufactured by the following method.

(i) Manufacturing of Sample Including Protective Film

A sample including a protective film (laminated film of a carbon film and a platinum film) was manufactured by the following method.

A sample having a size of a width direction 10 mm×longitudinal direction 10 mm of the magnetic tape was cut out from the magnetic tape which is a target acquiring the cos θ, with a blade. The width direction of the sample described below is a direction which was a width direction of the magnetic tape before the cutting out. The same applies to the longitudinal direction.

A protective film was formed on the surface of the magnetic layer of the cut-out sample to obtain a sample including a protective film. The formation of the protective film was performed by the following method.

A carbon film (thickness of 80 nm) was formed on the surface of the magnetic layer of the sample by vacuum deposition, and a platinum (Pt) film (thickness of 30 nm) was formed on the surface of the formed carbon film by sputtering. The vacuum deposition of the carbon film and the sputtering of the platinum film were respectively performed under the following conditions.

Vacuum Deposition Conditions of Carbon Film

Deposition source: carbon (core of a mechanical pencil having a diameter of 0.5 mm)

Degree of vacuum in a chamber of a vacuum deposition device: equal to or smaller than $2\times10^{-3}$ Pa Current value: 16 A Sputtering Conditions of Platinum Film Target: Pt Degree of vacuum in a chamber of a sputtering device: equal to or smaller than 7 Pa Current value: 15 mA (ii) Manufacturing Cross Section Observation Sample A sample having a thin film shape was cut out from the sample including a protective film manufactured in the section (i), by FIB processing using a gallium ion ($Ga^+$) beam. The cutting out was performed by performing following FIB processing two times. An acceleration voltage of the FIB processing was 30 kV.

In a first FIB processing, one end portion (that is, portion including one side surface of the sample including a protective film in the width direction) of the sample including a protective film in the longitudinal direction, including the area from the surface of the protective film to a region of a depth of approximately 5 μm was cut. The cut-out sample includes the area from the protective film to a part of the non-magnetic support.

Then, a microprobe was loaded on a cut-out surface side (that is, sample cross section side exposed by the cutting out) of the cut-out sample and the second FIB processing was performed. In the second FIB processing, the surface side opposite to the cut-out surface side (that is, one side surface in the width direction) was irradiated with a gallium ion beam to perform the cutting out of the sample. The sample was fixed by bonding the cut-out surface of the second FIB processing to the end surface of the mesh for STEM observation. After the fixation, the microprobe was removed.

In addition, the surface of the sample fixed to the mesh, from which the microprobe is removed, was irradiated with a gallium ion beam at the same acceleration voltage described above, to perform the FIB processing, and the sample fixed to the mesh was further thinned.

The cross section observation sample fixed to the mesh manufactured as described above was observed by a scanning transmission electron microscope, and the cos θ was acquired by the method described above. The cos θ acquired as described above is shown in Table 4.

10. Evaluation of Squareness Ratio (SQ)

The squareness ratio of each magnetic tape manufactured was measured at a magnetic field strength of 1194 kA/m(15 kOe) by using an oscillation sample type magnetic-flux meter (manufactured by Toei Industry Co., Ltd.). The measurement results are shown in Table 4.

11. Change (Decrease of SNR) in Electromagnetic Conversion Characteristics (Signal-To-Noise-Ratio (SNR)) After Repeated Running in Low Temperature and High Humidity Environment The electromagnetic conversion characteristics (SNR) were measured by the following method by using a reel tester having a width of ½ inches (0.0127 meters) and including a fixed head.

A head/tape relative speed was set as 5.5 m/sec, a metal-in-gap (MIG) head (gap length of 0.15 μm, track width of 1.0 μm) was used in the recording, and a recording current was set as an optimal recording current of each magnetic tape. As a reproducing head, a giant-magnetoresistive (GMR) head having an element thickness of 15 nm, a shield interval 0.1 μm, and a lead width of 0.5 μm was used. The recording of a signal was performed at linear recording density of 270 KFci, and measurement regarding a reproduction signal was performed with a spectrum analyzer manufactured by Shibasoku Co., Ltd. Regarding the signal, a signal which was sufficiently stabilized after starting the running of the magnetic tape was used. A ratio of an output value of a carrier signal and integrated noise of the entire spectral range was set as a SNR.

Under the conditions described above, a tape length for 1 pass was set as 1,000 m, the reciprocating running for 5,000 passes was allowed in an environment of an atmosphere temperature of 13° C. and relative humidity of 80% to perform reproduction (head/tape relative speed: 6.0 m/sec), and the SNR was measured. A difference between the SNR of the first pass and the SNR of the 5,000-th pass (SNR of the 5,000-th pass—SNR of the first pass) was acquired. When the difference is less than −2.0 dB, the magnetic tape can be determined as a magnetic tape which shows excellent electromagnetic conversion characteristics desired in a data back-up tape.

The result described above is shown in Table 4.

TABLE 4

| | Ferromagnetic hexagonal ferrite powder activation volume [nm³] | Magnetic solution dispersing agent Type | Magnetic solution dispersing agent Content [part] | Magnetic solution beads dispersion conditions First stage Dispersion retention time [h] | First stage Bead diameter [mmφ] | Second stage Dispersion retention time [h] | Second stage Bead diameter [mmφ] | Third stage Dispersion retention time [h] | Third stage Bead diameter [mmφ] | Abrasive liquid Abrasive BET specific surface [m²/g] | Abrasive liquid Beads dispersion [h] | Abrasive liquid dispersing agent (2,3-dihydroxy-naphthalene) Content [part] |
|---|---|---|---|---|---|---|---|---|---|---|---|---|
| COMPARATIVE EXAMPLE 1 | 2000 | — | — | 10 | 0.5 | — | — | — | — | 20 | 5 | 0 |
| COMPARATIVE EXAMPLE 2 | 2000 | — | — | 10 | 0.5 | — | — | — | — | 20 | 5 | 0 |
| COMPARATIVE EXAMPLE 3 | 2000 | — | — | 10 | 0.5 | — | — | — | — | 20 | 5 | 0 |
| COMPARATIVE EXAMPLE 4 | 2000 | — | — | 10 | 0.5 | — | — | — | — | 20 | 5 | 0 |
| COMPARATIVE EXAMPLE 5 | 2000 | — | — | 10 | 0.5 | — | — | — | — | 20 | 5 | 1 |
| COMPARATIVE EXAMPLE 6 | 2000 | — | — | 10 | 0.5 | — | — | — | — | 20 | 30 | 3 |
| COMPARATIVE EXAMPLE 7 | 2000 | — | — | 10 | 0.5 | — | — | — | — | 30 | 30 | 3 |
| COMPARATIVE EXAMPLE 8 | 2000 | 2,3-dihydroxy-naphthalene | 12.0 | 10 | 0.5 | 10 | 0.1 | — | — | 20 | 30 | 3 |
| COMPARATIVE EXAMPLE 9 | 2000 | Dispersing agent 1 | 6.0 | 10 | 0.5 | 10 | 0.1 | — | — | 20 | 5 | 0 |
| COMPARATIVE EXAMPLE 10 | 2000 | Dispersing agent 1 | 6.0 | 10 | 0.5 | 10 | 0.1 | — | — | 30 | 30 | 5 |
| EXAMPLE 1 | 2000 | Dispersing agent 1 | 6.0 | 10 | 0.5 | 10 | 0.1 | — | — | 20 | 5 | 1 |
| EXAMPLE 2 | 2000 | Dispersing agent 1 | 12.0 | 10 | 0.5 | 30 | 0.1 | — | — | 20 | 5 | 1 |
| EXAMPLE 3 | 2000 | Dispersing agent 1 | 12.0 | 10 | 0.5 | 10 | 0.1 | 10 | 0.05 | 20 | 5 | 1 |

TABLE 4-continued

| | | | | | | | | | | | | | |
|---|---|---|---|---|---|---|---|---|---|---|---|---|---|
| EXAMPLE 4 | 2000 | Dispersing agent 2 | 6.0 | 10 | 0.5 | 10 | 0.1 | — | — | 20 | 5 | 1 |
| EXAMPLE 5 | 2000 | Dispersing agent 3 | 6.0 | 10 | 0.5 | 10 | 0.1 | — | — | 20 | 5 | 1 |
| EXAMPLE 6 | 2000 | Dispersing agent 1 | 6.0 | 10 | 0.5 | 10 | 0.1 | — | — | 20 | 30 | 3 |
| EXAMPLE 7 | 2000 | Dispersing agent 1 | 6.0 | 10 | 0.5 | 10 | 0.1 | — | — | 30 | 30 | 3 |
| EXAMPLE 8 | 2000 | Dispersing agent 1 | 6.0 | 10 | 0.5 | 10 | 0.1 | — | — | 20 | 30 | 3 |
| EXAMPLE 9 | 1600 | Dispersing agent 1 | 6.0 | 10 | 0.5 | 10 | 0.1 | — | — | 20 | 30 | 3 |

| | Treatment conditions after mixing of magnetic solution, abrasive liquid, silica sol, other components, and finishing additive solvent | | | | | | | | Non-magnetic layer + magnetic Total thickness [μm] | Evaluation result | | | |
|---|---|---|---|---|---|---|---|---|---|---|---|---|---|
| | Beads dispersion time [min] | Ultrasonic dispersion time [min] | Filter average hole diameter | Vertical orientation process | Magnetic layer Thickness [μm] | Non-magnetic layer Thickness [μm] | Non-magnetic support Thickness [μm] | Back coating layer Thickness [μm] | | SQ [—] | Cosθ [—] | Plan view maximum area percentage of abrasive | SNR decrease [dB] |
| COMPARATIVE EXAMPLE 1 | 5 | 0.5 | 0.5 μm | Not performed | 0.10 | 1.00 | 4.30 | 0.60 | 1.10 | 0.58 | 0.68 | 0.06% | -0.3 |
| COMPARATIVE EXAMPLE 2 | 5 | 0.5 | 0.5 μm | Not performed | 0.10 | 0.70 | 4.30 | 0.60 | 0.80 | 0.58 | 0.68 | 0.06% | -0.5 |
| COMPARATIVE EXAMPLE 3 | 5 | 0.5 | 0.5 μm | Not performed | 0.10 | 0.50 | 4.30 | 0.60 | 0.60 | 0.58 | 0.68 | 0.06% | -2.6 |
| COMPARATIVE EXAMPLE 4 | 5 | 0.5 | 0.5 μm | Not performed | 0.10 | 0.10 | 4.30 | 0.60 | 0.20 | 0.58 | 0.68 | 0.06% | -5.4 |
| COMPARATIVE EXAMPLE 5 | 60 | 30 | 0.5 μm | Not performed | 0.10 | 0.50 | 4.30 | 0.60 | 0.60 | 0.58 | 0.68 | 0.05% | -3.7 |
| COMPARATIVE EXAMPLE 6 | 60 | 30 | 0.5 μm | Not performed | 0.10 | 0.50 | 4.30 | 0.60 | 0.60 | 0.58 | 0.68 | 0.04% | -4.8 |
| COMPARATIVE EXAMPLE 7 | 180 | 60 | 0.3 μm | Not performed | 0.10 | 0.50 | 4.30 | 0.60 | 0.60 | 0.58 | 0.68 | 0.02% | -6.5 |
| COMPARATIVE EXAMPLE 8 | 60 | 30 | 0.5 μm | Performed | 0.10 | 0.50 | 4.30 | 0.60 | 0.60 | 0.78 | 0.80 | 0.04% | -3.1 |
| COMPARATIVE EXAMPLE 9 | 5 | 0.5 | 0.5 μm | Performed | 0.10 | 0.50 | 4.30 | 0.60 | 0.60 | 0.73 | 0.87 | 0.06% | -6.0 |
| COMPARATIVE EXAMPLE 10 | 360 | 60 | 0.3 μm | Performed | 0.10 | 0.50 | 4.30 | 0.60 | 0.60 | 0.73 | 0.87 | 0.01% | -2.3 |
| EXAMPLE 1 | 60 | 30 | 0.5 μm | Performed | 0.10 | 0.50 | 4.30 | 0.60 | 0.60 | 0.73 | 0.87 | 0.05% | -0.7 |
| EXAMPLE 2 | 60 | 30 | 0.5 μm | Performed | 0.10 | 0.50 | 4.30 | 0.60 | 0.60 | 0.74 | 0.96 | 0.05% | -0.3 |
| EXAMPLE 3 | 60 | 30 | 0.5 μm | Performed | 0.10 | 0.50 | 4.30 | 0.60 | 0.60 | 0.74 | 0.98 | 0.05% | -0.2 |
| EXAMPLE 4 | 60 | 30 | 0.5 μm | Performed | 0.10 | 0.50 | 4.30 | 0.60 | 0.60 | 0.73 | 0.87 | 0.05% | -0.7 |
| EXAMPLE 5 | 60 | 30 | 0.5 μm | Performed | 0.10 | 0.50 | 4.30 | 0.60 | 0.60 | 0.73 | 0.85 | 0.05% | -0.8 |
| EXAMPLE 6 | 60 | 30 | 0.5 μm | Performed | 0.10 | 0.50 | 4.30 | 0.60 | 0.60 | 0.73 | 0.87 | 0.04% | -0.5 |
| EXAMPLE 7 | 180 | 60 | 0.3 μm | Performed | 0.10 | 0.50 | 4.30 | 0.60 | 0.60 | 0.73 | 0.87 | 0.02% | -0.6 |
| EXAMPLE 8 | 60 | 30 | 0.5 μm | Performed | 0.10 | 0.10 | 4.30 | 0.60 | 0.20 | 0.73 | 0.87 | 0.04% | -0.4 |
| EXAMPLE 9 | 60 | 30 | 0.5 μm | Performed | 0.10 | 0.50 | 4.30 | 0.60 | 0.60 | 0.72 | 0.86 | 0.04% | -0.5 |

With the comparison of Comparative Examples, it was confirmed that, in the case where the total thickness of the non-magnetic layer and the magnetic layer is equal to or smaller than 0.60 μm (Comparative Examples 3 to 10), the SNR is significantly decreased by the repeated running in a low temperature and high humidity environment, compared to the case where the total thickness of the non-magnetic layer and the magnetic layer exceeds 0.60 μm (Comparative Examples 1 and 2).

When a reproducing head after evaluation of the magnetic tape of each of Comparative Examples was visually observed, in a reproducing head of Comparative Examples 3, 4, and 9 after the evaluation, it was confirmed that a phenomenon called pole tip recession (PTR) in which a difference in level of an element portion and a sliding surface of a GMR head occurs. It is assumed that the PTR is generated due to the chipping of the element part of the GMR head caused by the sliding on the surface of the magnetic layer. Meanwhile, in the reproducing head of Comparative Examples 5 to 8 and 10 after the evaluation, it was confirmed that foreign materials were attached to the GMR head. It is considered that, when the abrasion properties of the surface of the magnetic layer are not sufficiently exhibited, the head attached materials are not removed.

With respect to this, in the magnetic tape of Examples 1 to 9, the total thickness of the non-magnetic layer and the magnetic layer was equal to or smaller than 0.60 μm, but a decrease in SNR was prevented, compared to the magnetic tape of Comparative Examples 3 to 10.

From the results shown in Table 4, an excellent correlation can be confirmed between the cos θ and a degree of the decrease of SNR, in that as the value of cos θ increases, the decrease of SNR is prevented (for example, see Examples 1 to 5 in which the plan view maximum area percentage of the abrasive is the same value). With respect to this, such a correlation was not observed between the squareness ratio (SQ) and a degree of the decrease of SNR, as shown in Table 4.

The invention is effective in technical fields of magnetic tapes for high-density recording.

What is claimed is:

1. A magnetic tape comprising:
   a non-magnetic support;
   a non-magnetic layer including non-magnetic powder and a binding agent on the non-magnetic support; and
   a magnetic layer including ferromagnetic powder and a binding agent on the non-magnetic layer,
   wherein the total thickness of the non-magnetic layer and the magnetic layer is equal to or smaller than 0.60 μm,
   the ferromagnetic powder is ferromagnetic hexagonal ferrite powder,
   the magnetic layer includes an abrasive,
   the percentage of a plan view maximum area of the abrasive confirmed in a region having a size of 4.3 μm×6.3 μm of the surface of the magnetic layer by plane observation using a scanning electron microscope, with respect to the total area of the region is equal to or greater than 0.02% and less than 0.06%,
   the tilt cos θ of the ferromagnetic hexagonal ferrite powder with respect to a surface of the magnetic layer acquired by cross section observation performed by using a scanning transmission electron microscope is 0.85 to 1.00, and
   the percentage of hexagonal ferrite particles having a length in the long axis direction of equal to or greater than 10 nm and having an aspect ratio in a range of 1.5 to 6.0 in all of the hexagonal ferrite particles is equal to or greater than 50% but equal to or smaller than 95%, based on the particle number.

2. The magnetic tape according to claim 1, wherein a BET specific surface area of the abrasive is in a range of 14 to 40 m²/g.

3. The magnetic tape according to claim 1, wherein the abrasive is alumina powder.

4. The magnetic tape according to claim 2, wherein the abrasive is alumina powder.

5. The magnetic tape according to claim 1, wherein the cos θ is 0.89 to 1.00.

6. The magnetic tape according to claim 1, wherein the cos θ is 0.95 to 1.00.

7. The magnetic tape according to claim 2, wherein the cos θ is 0.89 to 1.00.

8. The magnetic tape according to claim 2, wherein the cos θ is 0.95 to 1.00.

9. The magnetic tape according to claim 3, wherein the cos θ is 0.89 to 1.00.

10. The magnetic tape according to claim 3, wherein the cos θ is 0.95 to 1.00.

11. The magnetic tape according to claim 4, wherein the cos θ is 0.89 to 1.00.

12. The magnetic tape according to claim 4, wherein the cos θ is 0.95 to 1.00.

13. The magnetic tape according to claim 1, wherein the magnetic layer includes a polyester chain-containing compound having a weight-average molecular weight of 1,000 to 80,000.

14. The magnetic tape according to claim 1, wherein the activation volume of the ferromagnetic hexagonal ferrite powder is 800 nm³ to 2,500 nm³.

15. The magnetic tape according to claim 1, wherein the percentage of a plan view maximum area of the abrasive confirmed in a region having a size of 4.3 μm×6.3 μm of the surface of the magnetic layer by plane observation using a scanning electron microscope, with respect to the total area of the region is 0.02% to 0.05%.

16. The magnetic tape according to claim 1, wherein the total thickness of the non-magnetic layer and the magnetic layer is 0.20 μm to 0.60 μm.

17. The magnetic tape according to claim 1, wherein the magnetic layer includes an aromatic hydrocarbon compound including a phenolic hydroxyl group.

18. The magnetic tape according to claim 1, wherein the ferromagnetic hexagonal ferrite powder includes Al.

19. The magnetic tape according to claim 1, wherein the tilt cos θ is 0.85 to 0.98.

* * * * *